US011927570B2

(12) United States Patent
Saito et al.

(10) Patent No.: US 11,927,570 B2
(45) Date of Patent: *Mar. 12, 2024

(54) ESTIMATION DEVICE, INSPECTION SYSTEM, ESTIMATION METHOD, AND STORAGE MEDIUM

(71) Applicant: KABUSHIKI KAISHA TOSHIBA, Tokyo (JP)

(72) Inventors: Masahiro Saito, Yokohama (JP); Yasunori Chiba, Yokohama (JP); Akira Ushijima, Yokohama (JP); Toshiyuki Ono, Kawasaki (JP); Atsushi Matsumura, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/950,473

(22) Filed: Sep. 22, 2022

(65) Prior Publication Data

US 2023/0012631 A1    Jan. 19, 2023

Related U.S. Application Data

(62) Division of application No. 15/931,148, filed on May 13, 2020, now Pat. No. 11,480,549.

(30) Foreign Application Priority Data

May 14, 2019   (JP) ................... 2019-091717

(51) Int. Cl.
*G01N 29/44*    (2006.01)
*G01N 29/07*    (2006.01)
*G01N 29/11*    (2006.01)

(52) U.S. Cl.
CPC ............. *G01N 29/44* (2013.01); *G01N 29/07* (2013.01); *G01N 29/11* (2013.01); *G01N 2291/267* (2013.01)

(58) Field of Classification Search
USPC .......................................... 73/602
See application file for complete search history.

(56) References Cited

U.S. PATENT DOCUMENTS 3,678,736 A   7/1972  May
7,693,251 B2  4/2010  Kono
(Continued)

FOREIGN PATENT DOCUMENTS

CN   102639996 A   8/2012
CN   108226290 A   6/2018
(Continued)

OTHER PUBLICATIONS

Mizoda, H., "Development of a technique for measuring weld pool depth during welding Evaluation method of molten pool depth using phased array ultrasonic device", Ultrasonic Technology, vol. 27, No. 6, Nov. 12, 2015, pp. 63-66 (with unedited computer generated English translation).

*Primary Examiner* — Jacques M Saint Surin
(74) *Attorney, Agent, or Firm* — Oblon, McClelland, Maier & Neustadt, L.L.P.

(57) ABSTRACT

According to one embodiment, an estimation device includes a processor. The processor accepts information. The information is acquired by each of a plurality of ultrasonic sensors transmitting an ultrasonic wave in a second direction toward a weld portion and receiving a reflected wave. The ultrasonic sensors are arranged in a first direction. The second direction crosses the first direction. The processor estimates a range of the weld portion in the second direction based on an intensity distribution of the reflected wave in the second direction. The processor cal- (Continued)

culates a centroid position of an intensity distribution of the reflected wave in the first direction for each of a plurality of points in the second direction, and estimates a range of the weld portion in the first direction based on a plurality of the centroid positions.

14 Claims, 24 Drawing Sheets

(56) References Cited

U.S. PATENT DOCUMENTS

| | | | |
|---|---|---|---|
| 11,131,652 | B2 | 9/2021 | Ushijima |
| 11,249,051 | B2 | 2/2022 | Ono |
| 11,480,549 | B2 * | 10/2022 | Saito ...................... G01N 29/07 |
| 2009/0178482 | A1 | 7/2009 | Hough et al. |
| 2012/0243771 | A1 | 9/2012 | Matsumoto et al. |
| 2016/0320344 | A1 | 11/2016 | Spencer et al. |
| 2020/0003735 | A1 | 1/2020 | Ushijima et al. |
| 2020/0018727 | A1 | 1/2020 | Ono et al. |
| 2021/0389279 | A1 | 12/2021 | Ushijima |
| 2022/0120715 | A1 | 4/2022 | Ono |

FOREIGN PATENT DOCUMENTS

| | | |
|---|---|---|
| JP | 61-215908 A | 9/1986 |
| JP | 2007-278809 A | 10/2007 |
| JP | 2008-51645 A | 3/2008 |
| JP | 3189500 U | 3/2014 |
| JP | 5618529 B2 | 11/2014 |
| JP | 2019-90727 A | 6/2019 |
| JP | 2020-8452 A | 1/2020 |
| WO | WO 2016/164457 A1 | 10/2016 |

\* cited by examiner

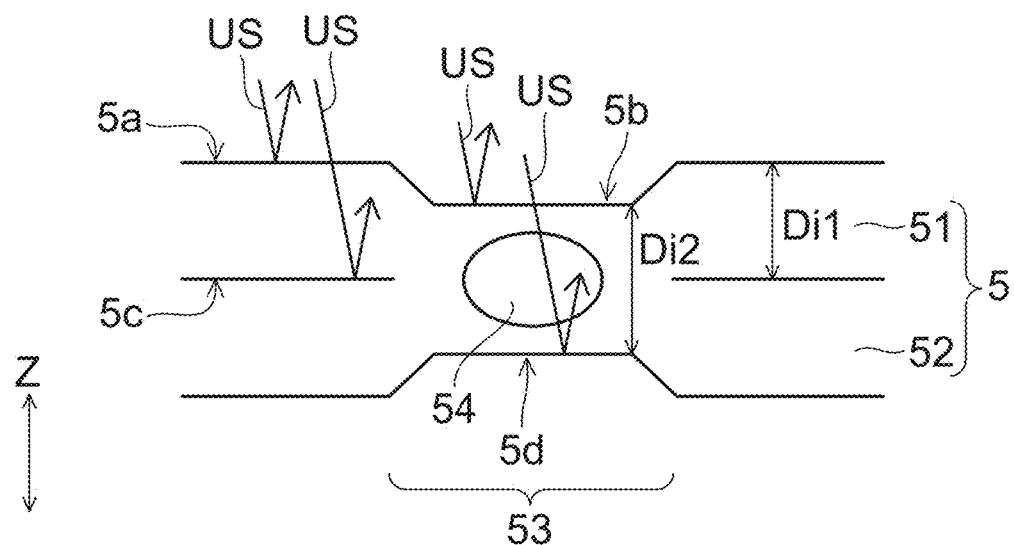
FIG. 5A
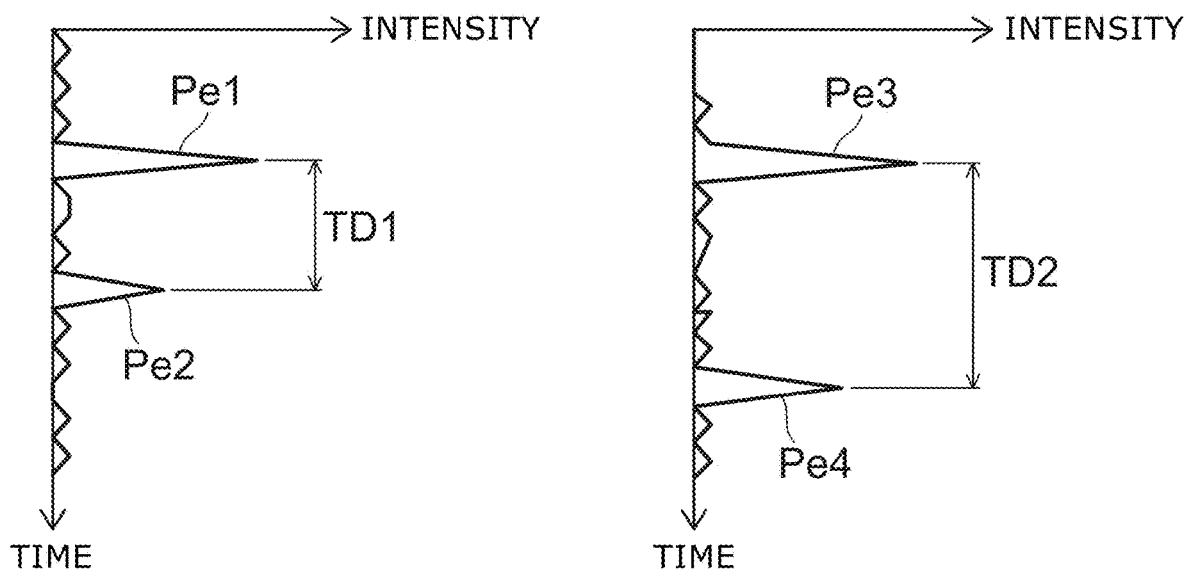
FIG. 5B
FIG. 5C

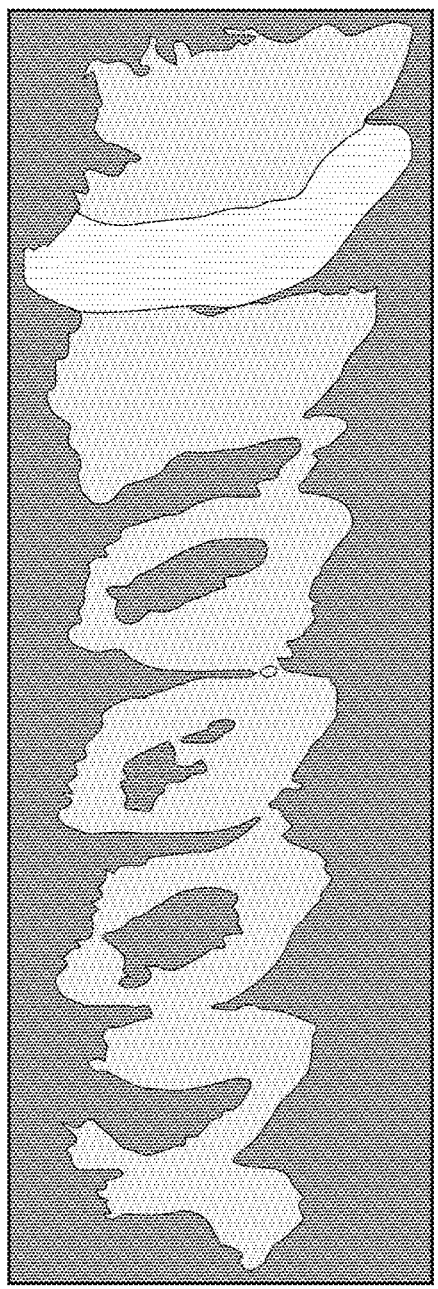
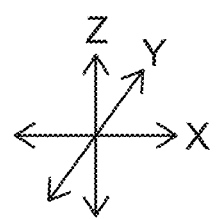
FIG. 20

ESTIMATION DEVICE, INSPECTION SYSTEM, ESTIMATION METHOD, AND STORAGE MEDIUM

CROSS-REFERENCE TO RELATED APPLICATIONS

This application is a divisional of and claims benefit under 35 U.S.C. § 120 to U.S. application Ser. No. 15/931,148, filed on May 13, 2020, which is based upon and claims the benefit of priority under 35 U.S.C. § 119 to Japanese Patent Application No. 2019-091717, filed on May 14, 2019. The entire contents of each of the above-identified applications are incorporated herein by reference.

FIELD

Embodiments described herein relate generally to an estimation device, an inspection system, an estimation method, and a storage medium.

BACKGROUND

In welding, one member is made by joining portions of two or more components to each other by melting. The member that is made by welding is inspected for whether or not the welded portion (hereinbelow, called the weld portion) is joined appropriately. For example, in a non-destructive inspection, a probe that includes ultrasonic sensors is caused to contact the weld portion. Then, an ultrasonic wave is transmitted toward the weld portion, and the existence or absence of the joint is verified based on the reflected wave.

When the ultrasonic wave is reflected by portions other than the weld portion, it is desirable to inspect the joint based on the components reflected from the weld portion to increase the inspection accuracy of the joint. To this end, technology in which the range of the weld portion can be estimated based on the reception result of the reflected wave is desirable.

BRIEF DESCRIPTION OF THE DRAWINGS

FIGS. 5A to 5C are schematic views for describing the inspection method using the inspection system according to the embodiment;

FIG. 20 is a schematic view illustrating images of the weld portion vicinity;

DETAILED DESCRIPTION

Figure 1:
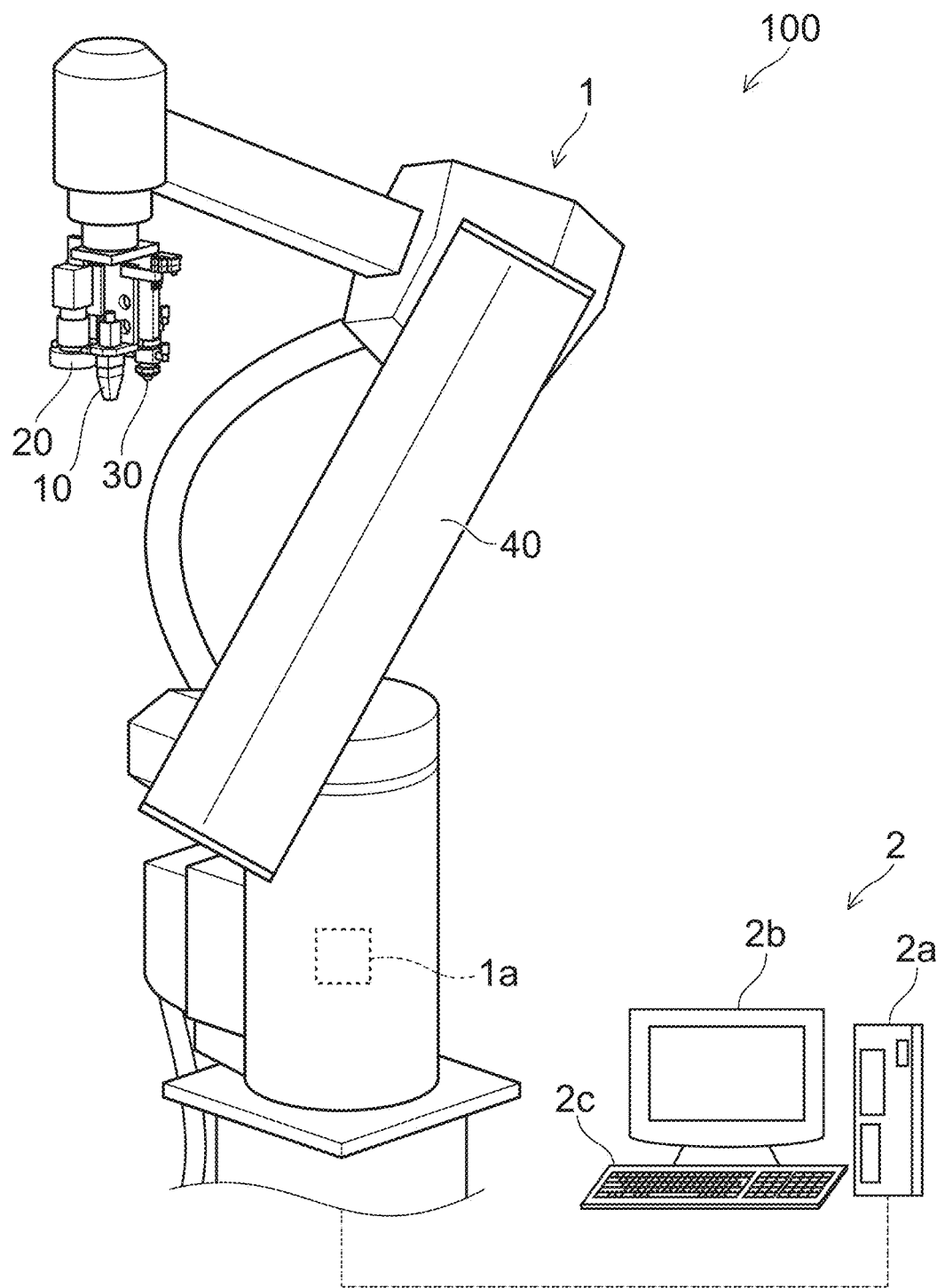
FIG. 1 is a schematic view illustrating an inspection system according to an embodiment.

According to one embodiment, an estimation device includes a processor. The processor accepts information. The information is acquired by each of a plurality of ultrasonic sensors transmitting an ultrasonic wave in a second direction toward a weld portion and receiving a reflected wave. The ultrasonic sensors are arranged in a first direction. The second direction crosses the first direction. The processor estimates a range of the weld portion in the second direction based on an intensity distribution of the reflected wave in the second direction. The processor calculates a centroid position of an intensity distribution of the reflected wave in the first direction for each of a plurality of points in the second direction, and estimates a range of the weld portion in the first direction based on a plurality of the centroid positions.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view illustrating an inspection system according to an embodiment.

Figure 2:
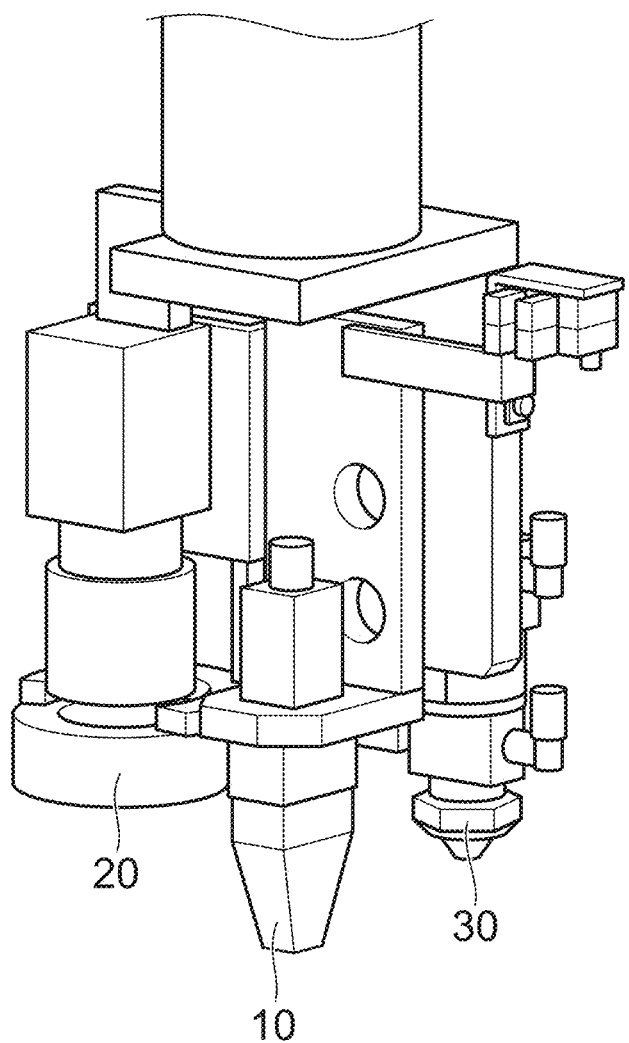
FIG. 2 is a perspective view illustrating a portion of the inspection system according to the embodiment.

FIG. 2 is a perspective view illustrating a portion of the inspection system according to the embodiment.

The inspection system 100 according to the embodiment is used in a non-destructive inspection of a weld portion in which two or more components are joined.

The inspection system 100 according to the embodiment as illustrated in FIG. 1 includes an inspection apparatus 1 and an estimation device 2. As illustrated in FIG. 2, the inspection apparatus 1 includes a probe 10, an imager 20, a coater 30, and an arm 40.

The probe 10 includes multiple ultrasonic sensors for inspecting the weld portion. The imager 20 acquires an image by imaging the welded member. The imager 20 extracts the weld mark from the image and detects roughly the position of the weld portion. The coater 30 coats a couplant onto the upper surface of the weld portion. The couplant is used to provide acoustic matching of the ultrasonic wave between the probe 10 and the inspection object. The couplant may be a liquid or a gel.

For example, the probe 10, the imager 20, and the coater 30 are provided at the tip of the arm 40 as illustrated in FIG. 2. The arm 40 is, for example, an articulated robot. The probe 10, the imager 20, and the coater 30 can be displaced by driving the arm 40.

The inspection apparatus 1 includes, for example, a controller 1a. The controller 1a includes a central processing unit (CPU) including a processing circuit. The controller 1a controls the operations of the components described above that are included in the inspection apparatus 1.

The estimation device 2 includes a processor 2a. The processor 2a includes a CPU including a processing circuit. The processor 2a estimates the position of the weld portion based on information acquired by the inspection apparatus 1.

The estimation device 2 may include a display device 2b and an input device 2c. The display device 2b includes, for example, a monitor, a projector, or a printer. The input device 2c includes, for example, a keyboard, a mouse, a touchpad, or a microphone (audio input), A device such as a touch panel that functions as both a display device and an input device may be used.

The inspection apparatus 1 is connected to the estimation device 2 via wired communication, wireless communication, or a network. Or, the estimation device 2 may be embedded in the inspection apparatus 1, and one device may function as both the inspection apparatus 1 and the estimation device 2. In such a case, only one of the controller 1a or the processor 2a may be provided, and the one of the controller is or the processor 2a may function as both the controller 1a and the processor 2a.

Figure 3:
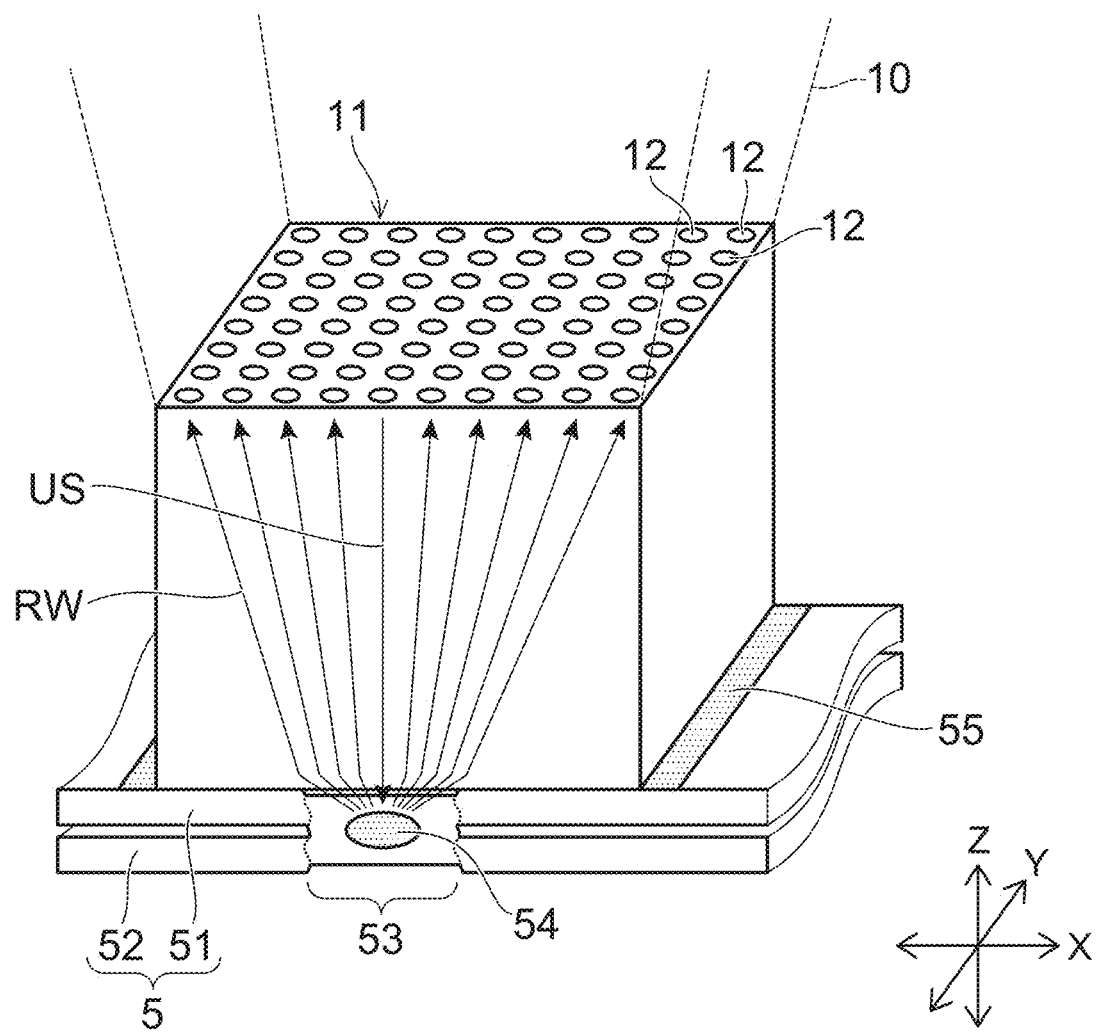
FIG. 3 is a schematic view illustrating the internal structure of the probe tip of the inspection system according to the embodiment.

FIG. 3 is a schematic view illustrating the internal structure of the probe tip of the inspection system according to the embodiment.

A matrix sensor 11 illustrated in FIG. 3 is provided inside the probe 10 tip. The matrix sensor 11 includes multiple ultrasonic sensors 12. The ultrasonic sensors 12 are, for example, transducers. The multiple ultrasonic sensors 12 are arranged in an X-direction (a first direction) and a Y-direction (a third direction) that cross each other. In the example, the X-direction and the Y-direction are orthogonal. The X-direction and the Y-direction may not be orthogonal. The probe 10 moves in a Z-direction (a second direction) crossing a surface including the X-direction and the Y-direction, and contacts the inspection object.

FIG. 3 illustrates a state of inspecting a member 5. The member 5 is made by performing spot welding of a metal plate 51 (a first member) and a metal plate 52 (a second member) at a weld portion 53. A solidified portion 54 is formed at the weld portion 53 by a portion of the metal plate 51 and a portion of the metal plate 52 melting, mixing, and solidifying, Each of the ultrasonic sensors 12 transmits an ultrasonic wave US toward the member 5 coated with a couplant 55 and receives a reflected wave RW from the member 5.

In one more specific example as illustrated in FIG. 3, one ultrasonic sensor 12 transmits the ultrasonic wave US toward the weld portion 53. A portion of the ultrasonic wave US is reflected by the upper surface or the lower surface of the member 5, etc. Each of the multiple ultrasonic sensors 12 receives (detects) the reflected wave RW, The weld portion 53 vicinity of the member 5 is two-dimensionally inspected by each of the ultrasonic sensors 12 sequentially transmitting the ultrasonic wave US, and by the multiple ultrasonic sensors 12 receiving the reflected waves RW.

Figure 4:
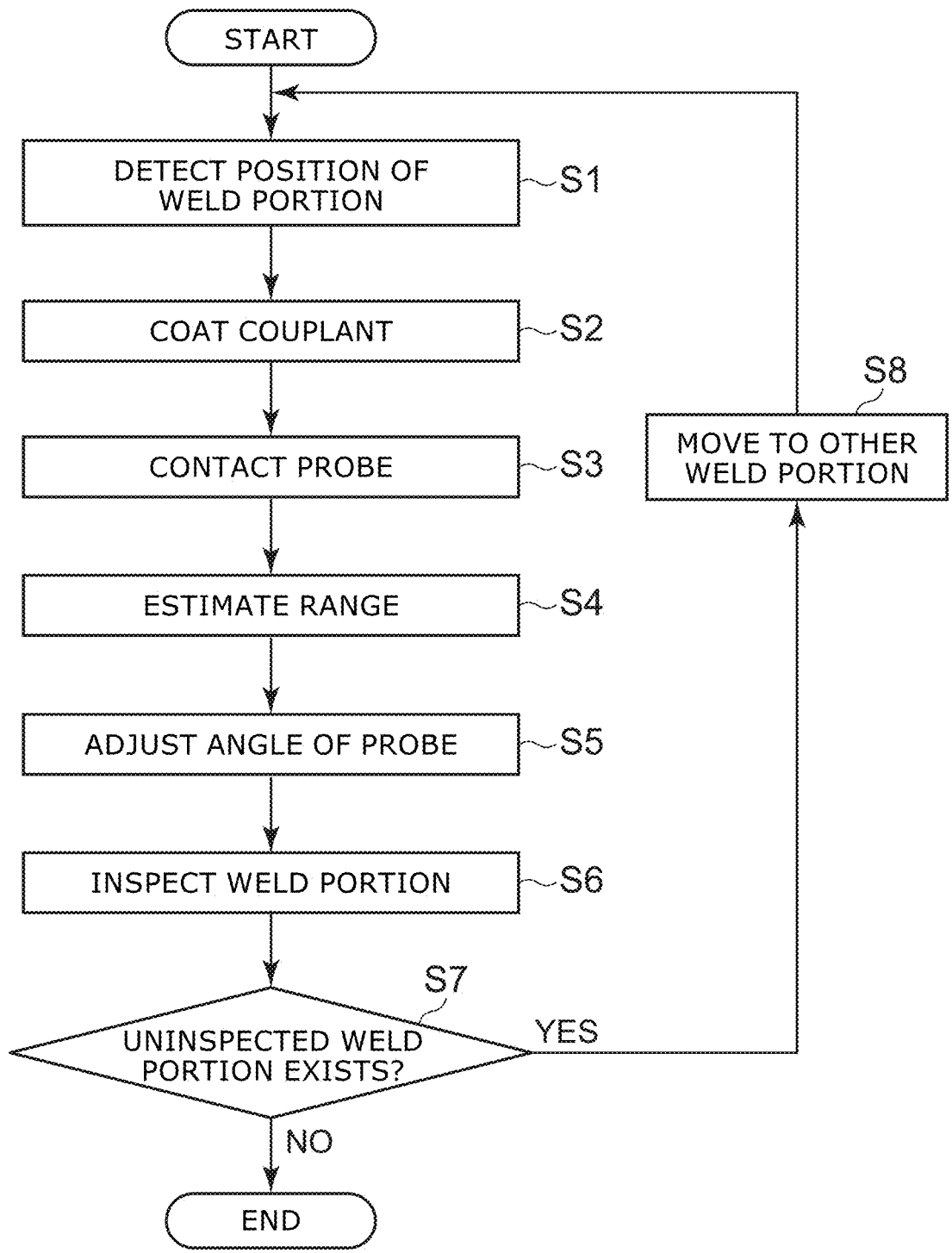
FIG. 4 is a flowchart illustrating an overview of the operation of the inspection system according to the embodiment.

FIG. 4 is a flowchart illustrating an overview of the operation of the inspection system according to the embodiment.

First, the imager 20 images the member 5 and detects the position of the weld portion 53 from the acquired image (step S1). The arm 40 moves the coater 30 to a position opposing the weld portion 53 in the Z-direction. The coater 30 coats the couplant onto the weld portion (step S2), The arm 40 moves the probe 10 in the Z-direction and causes the probe 10 to contact the weld portion 53 (step S3).

In the state in which the probe 10 contacts the weld portion 53, the multiple ultrasonic sensors 12 transmit the ultrasonic waves US toward the member 5 including the weld portion 53 and receive the reflected waves RW. The inspection apparatus 1 transmits, to the estimation device 2, the information obtained by receiving the reflected waves RW. When accepting the information, the processor 2a estimates the range of the weld portion 53 in the X-direction, the Y-direction, and the Z-direction (step S4).

The inspection apparatus 1 drives the arm 40 based on the reception result of the reflected waves in the range estimated by the estimation device 2. By driving the arm, the inspection apparatus 1 displaces the probe 10 and adjusts the angle of the probe 10 (step S5). After the adjustment of the angle, the multiple ultrasonic sensors 12 transmit the ultrasonic waves US and receive the reflected waves RW. The weld portion 53 is inspected thereby (step S6). The controller 1a determines whether or not an uninspected weld portion 53 exists (step S7). The inspection ends when no uninspected weld portion 53 exists. When an uninspected weld portion 53 exists, the controller 1a drives the arm 40 and moves the probe 10, the imager 20, and the coater 30 toward another weld portion 53 (step S8). Subsequently, steps S1 to S7 are performed again.

There are cases where an upper surface 5b and a lower surface 5d of the weld portion 53 are tilted with respect to an upper surface 5a of the metal plate 51. This is due to the weld portion 53 including the solidified portion 54, shape deformation in the welding process, etc. In such a case, it is desirable for the ultrasonic waves US to be transmitted along a direction that is, on average, perpendicular to the upper surface 5b or the lower surface 5d. Thereby, the ultrasonic waves can be reflected more strongly at the upper surface 5b and the lower surface 5d, and the accuracy of the inspection can be increased. Also, steps S4 and S5 may be repeated alternately. Thereby, the angle of the probe 10 can be adjusted to a more appropriate value. As a result, the accuracy of the inspection of the weld portion can be improved further.

FIGS. 5A to 5C are schematic views for describing the inspection method using the inspection system according to the embodiment.

As illustrated in FIG. 5A, a portion of the ultrasonic wave US is reflected by the upper surface 5a of the metal plate 51 or the upper surface 5b of the weld portion 53. Another portion of the ultrasonic wave US enters the member 5 and is reflected by a lower surface 5c of the metal plate 51 or the lower surface 5d of the weld portion 53.

The positions in the Z-direction of the upper surface 5a, the upper surface 5b, the lower surface 5c, and the lower surface 5d are different from each other. In other words, the distances in the Z-direction between the ultrasonic sensor 12 and these surfaces are different from each other. The peak of the intensity of the reflected wave is detected when the ultrasonic sensor 12 receives the reflected waves from these surfaces. Which surface reflected the ultrasonic wave US can be verified by calculating the time until each peak is detected after transmitting the ultrasonic wave US.

The intensity of the reflected wave may be represented in any form. For example, the reflected wave intensity that is output from the ultrasonic sensor 12 may include positive values and negative values according to the phase. Various processing may be performed based on the reflected wave intensity including the positive values and the negative values. The reflected wave intensity that includes the positive values and the negative values may be converted into absolute values. The average value of the reflected wave intensities may be subtracted from the reflected wave intensity at each time. Or, the weighted average value, the weighted moving average value, or the like of the reflected wave intensities may be subtracted from the reflected wave intensity at each time. The various processing described in the application can be performed even when results of such processing applied to the reflected wave intensity are used.

FIG. 5B and FIG. 5C are graphs illustrating the relationship between the time after transmitting the ultrasonic wave US and the intensity of the reflected wave RW. Here, the intensity of the reflected wave RW is illustrated as an absolute value. The graph of FIG. 5B illustrates the reception result of the reflected waves RW from the upper surface 5a and the lower surface 5c of the metal plate 51. The graph of FIG. 5C illustrates the reception result of the reflected waves RW from the upper surface 5b and the lower surface 5d of the weld portion 53.

In the graph of FIG. 53, a peak Pe1 occurring first is based on the reflected wave RW from the upper surface 5a. A peak Pe2 occurring second is based on the reflected wave RW from the lower surface 5c. The times when the peak Pe1 and the peak Pe2 are detected correspond respectively to the positions in the Z-direction of the upper surface 5a and the lower surface 5c of the metal plate 51. A time difference TD1 between the time when the peak Pe1 is detected and the time when the peak Pe2 is detected corresponds to a distance Di1 in the Z-direction between the upper surface 5a and the lower surface 5c.

Similarly, in the graph of FIG. 5C, a peak Pe3 occurring first is based on the reflected wave RW from the upper surface 5b. A peak Pe4 occurring second is based on the reflected wave RW from the lower surface 5d. The times when the peak Pe3 and the peak Pe4 are detected correspond respectively to the positions in the Z-direction of the upper surface 5b and the lower surface 5d of the weld portion 53. A time difference TD2 between the time when the peak Pe3 is detected and the time when the peak Pe4 is detected corresponds to a distance Dig in the Z-direction between the upper surface 5b and the lower surface 5d.

Step S4 will now be described in detail with reference to FIG. 6A to FIG. 12.

Figure 6A:
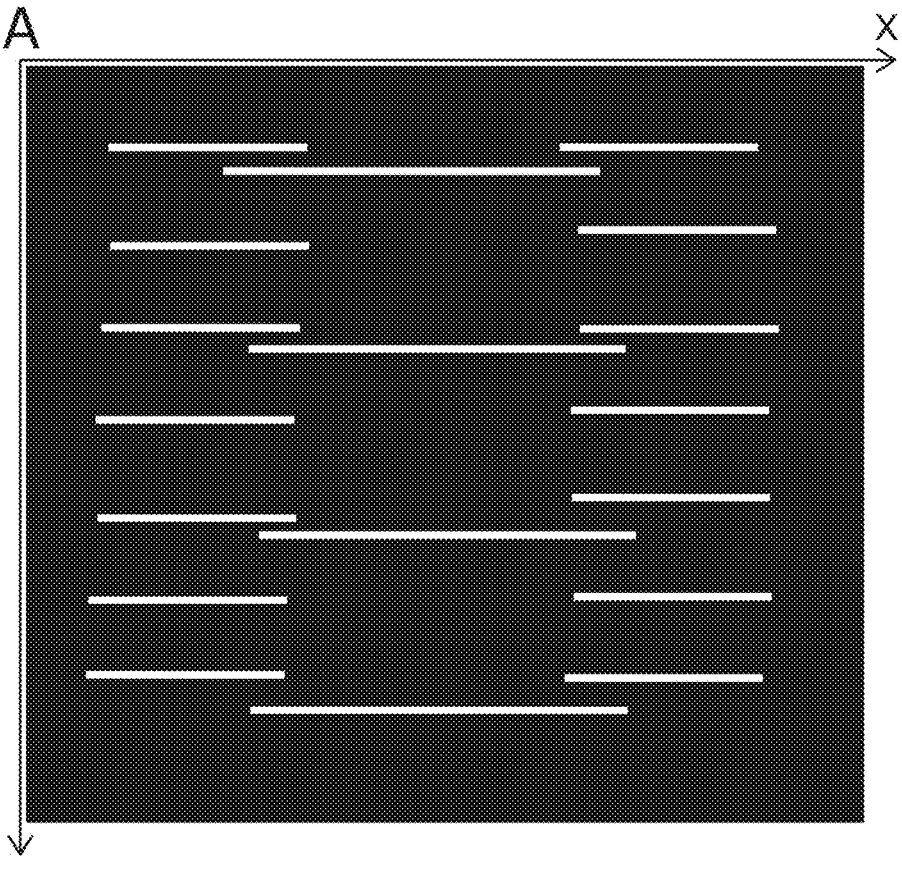
FIG. 6A and FIG. 6B are schematic views of images based on the reception result of the reflected waves.
Figure 6B:
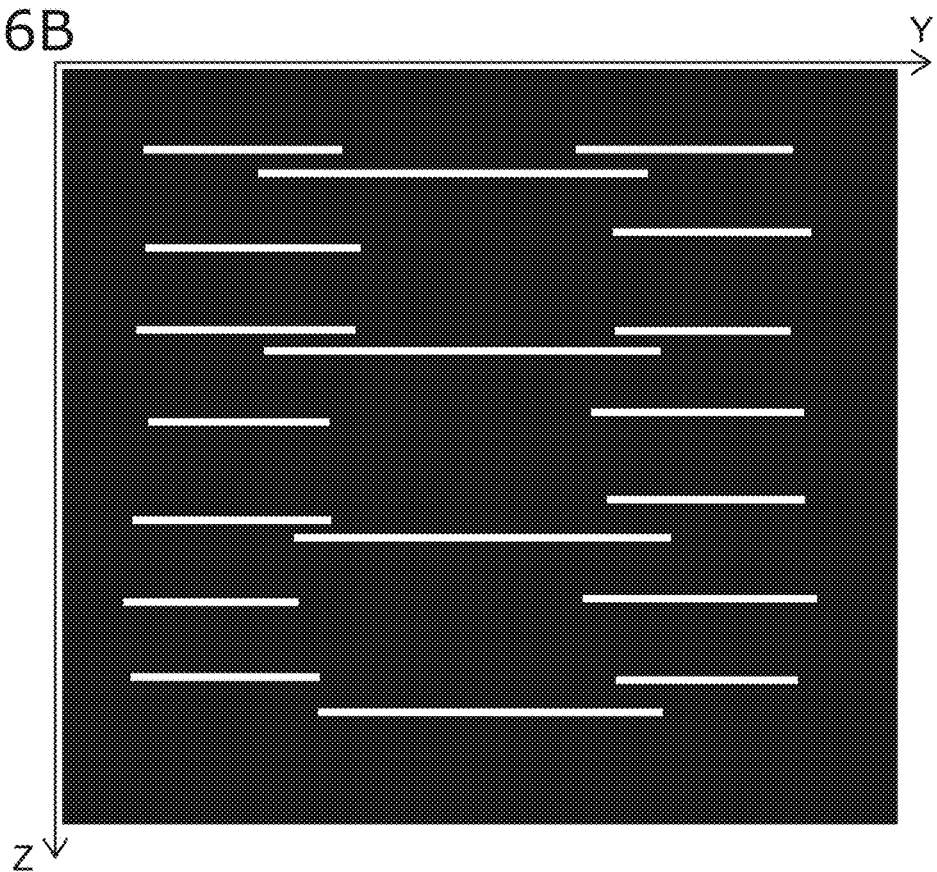

FIG. 6A and FIG. 6B are schematic views of images based on the reception result of the reflected waves.

FIG. 6A illustrates the state of the inspection object in the X-Z cross section. FIG. 63 illustrates the state of the inspection object in the Y-Z cross section.

In FIG. 6A and FIG. 63, the points where the intensity of the reflected wave is high are illustrated using white. Here, the binarized intensity of the reflected wave is illustrated schematically. The position in the Z-direction corresponds to the time from emitting the ultrasonic wave until the reflected wave is received. The white lines that extend along the X-direction or the Y-direction illustrate the surfaces of the members.

In FIG. 6A and FIG. 6B, multiple white lines that exist at the center in the X-direction or the Y-direction are based on the reflected waves from the upper surface 5b and the lower surface 5d of the weld portion 53. The multiple white lines that exist at the sides in the X-direction or the Y-direction are based on the reflected waves from the upper surface 5a and the lower surface 5c of the metal plate 51 or the upper surface and the lower surface of the metal plate 52, Three or more white lines exist in the Z-direction in FIG. 6A and FIG. 6B. This shows that the ultrasonic waves US undergo multiple reflection between the upper surface and the lower surface of each portion of the member 5.

As illustrated in FIG. 6A and FIG. 613, the reception result of the reflected waves of the matrix sensor 11 also includes reflected waves from portions other than the weld portion 53. The estimation device 2 estimates the range of the weld portion 53 from the reception result of the reflected waves.

Here, as illustrated in FIG. 6A and FIG. 6B, the reception result of the reflected waves are illustrated two-dimensionally. The reception result of the reflected waves may be illustrated three-dimensionally. For example, the member 5 may be illustrated by multiple voxels. Coordinates in the X-direction, the Y-direction, and the Z-direction are set for each of the voxels. A reflected wave intensity is associated with each of the voxels based on the reception result of the reflected waves. The estimation device 2 estimates a range (a group of voxels) corresponding to the weld portion 53 for the multiple voxels.

Figure 7A:
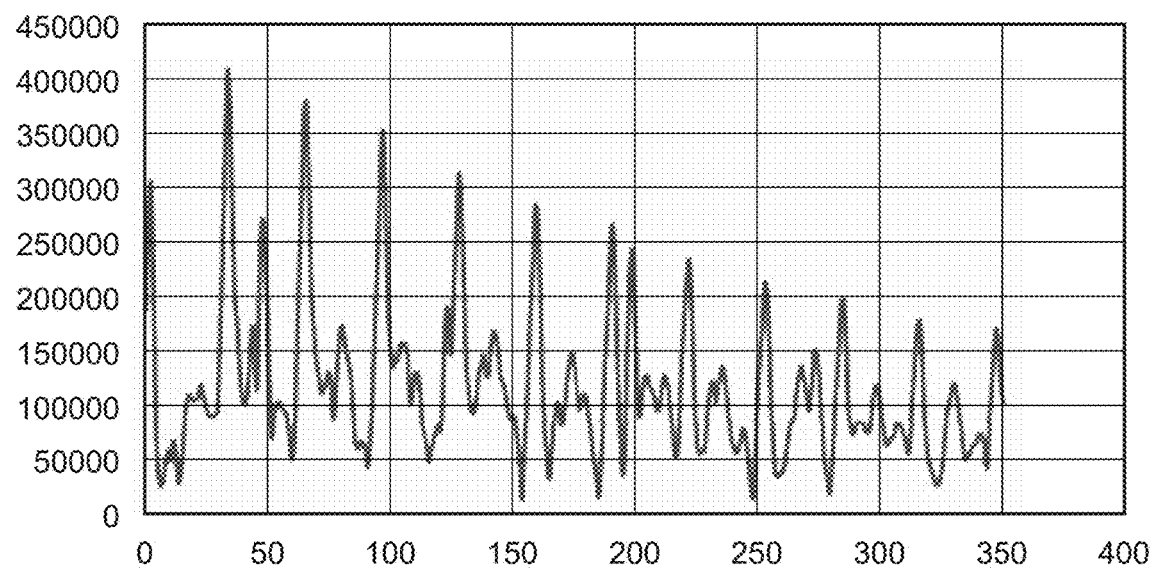
FIG. 7A and FIG. 7B are graphs illustrating the intensity distribution of the reflected wave in the Z-direction for one cross section each.

FIG. 7A and FIG. 713 are graphs illustrating the intensity distribution of the reflected wave in the Z-direction for one cross section each.

Figure 8:
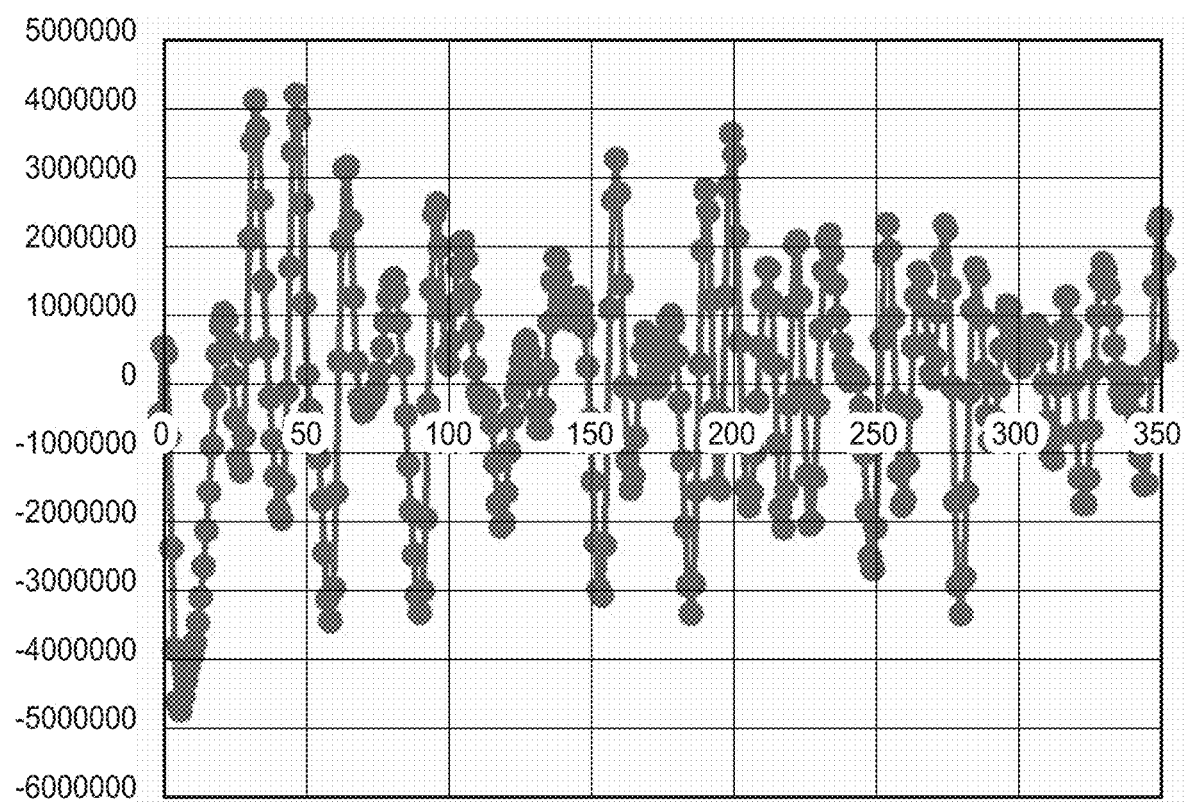
FIG. 8 is a graph illustrating the intensity distribution of the reflected wave in the Z-direction.

FIG. 8 is a graph illustrating the intensity distribution of the reflected wave in the Z-direction.

Figure 7B:
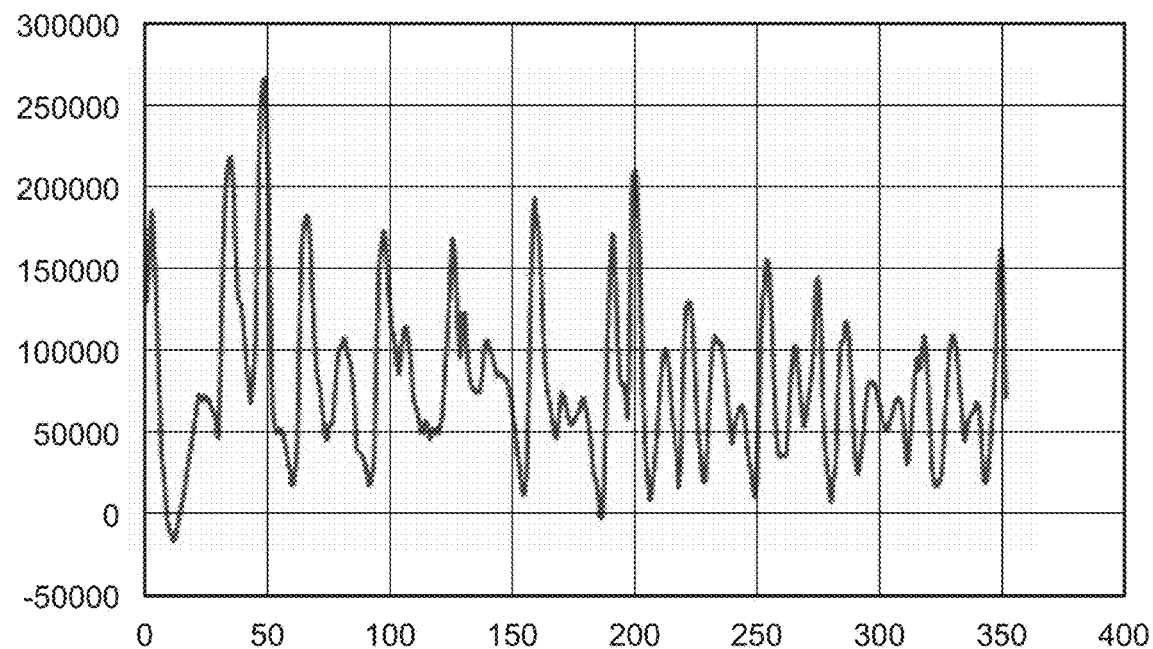

The processor 2a calculates the intensity distribution of the reflected wave in the Z-direction based on the reception result of the reflected waves. FIG. 7A and FIG. 7B are such examples. In FIG. 7A and FIG. 7B, the horizontal axis is the position in the Z-direction, and the vertical axis is the intensity of the reflected wave, FIG. 7A illustrates the intensity distribution of the reflected wave in the Z-direction in one X-Z cross section. FIG. 7B illustrates the intensity distribution of the reflected wave in the Z-direction in one Y-Z cross section. FIG. 7A and FIG. 7B illustrate the results in which the reflected wave intensity is converted into an absolute value.

Or, the processor 2a may generate the intensity distribution of the reflected wave in the Z-direction by summing the reflected wave intensities in the X-Y plane for each of multiple points in the Z-direction. FIG. 8 is such an example. In FIG. 8, the horizontal axis is the position in the Z-direction, and the vertical axis is the intensity of the reflected wave. FIG. 8 illustrates the results of converting the reflected wave intensity into an absolute value and subtracting the average value of the reflected wave intensities from the reflected wave intensity for each of the multiple points in the Z-direction.

The intensity distribution of the reflected wave in the Z-direction includes components reflected by the upper surface and the lower surface of the weld portion and components reflected by the upper surface and the lower surface of other portions. In other words, the intensity distribution includes periodic components corresponding to the time difference TD1 illustrated in FIG. 6B and periodic components corresponding to the time difference TD2 illustrated in FIG. 6C.

The processor 2a uses filtering to extract only the components reflected by the upper surface and the lower surface of the weld portion from the intensity distribution of the reflected wave. For example, values that correspond to integer multiples of half of the thickness in the Z-direction (the distance between the upper surface and the lower surface) of the weld portion are preset. The processor 2a extracts only the periodic components of the values by referring to the values.

Figure 9:
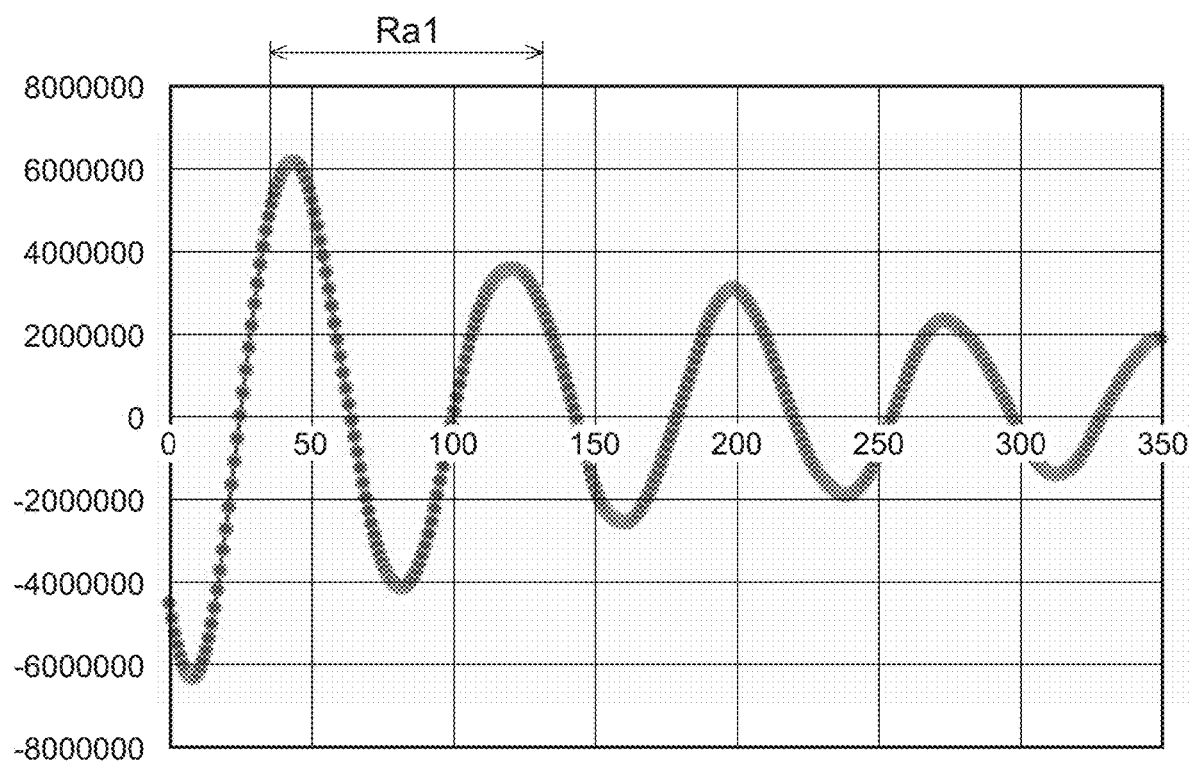
FIG. 9 is a graph illustrating the results of filtering the intensity distribution of the reflected wave.

A band-pass filter, a zero-phase filter, a low-pass filter, a high-pass filter, threshold determination of the intensity after the filtering, etc., can be used as the filtering, FIG. 9 is a graph illustrating the results of filtering the intensity distribution of the reflected wave.

In FIG. 9, the horizontal axis is the position in the Z-direction, and the vertical axis is the intensity of the reflected wave. In the results of the filtering as illustrated in FIG. 9, only the components reflected by the upper surface and the lower surface of the weld portion are extracted.

The processor 2a estimates the range of the weld portion in the Z-direction based on the extraction results. For example, the processor 2a detects peaks included in the extraction results. The processor 2a detects the position in the Z-direction of a first peak and the position in the Z-direction of a second peak. For example, the processor 2a uses these positions as references to estimate a range Ra1 illustrated in FIG. 9 to be the range of the weld portion in the Z-direction.

There are cases where the sign (positive or negative) of the reflected wave intensity from the upper surface of the weld portion and the sign of the reflected wave intensity from the lower surface of the weld portion are reversed due to the structure of the weld portion, the configuration of the matrix sensor 11, etc. In such a case, the processor 2a may detect the peak of one of positive or negative and the peak of the other of positive or negative. The processor 2a uses the positions of these peaks as references to estimate the range of the weld portion in the Z-direction. Also, according to the processing of the reflected wave intensity, there are cases where the reflected wave intensity has only positive values or negative values. In such a case, the range of the weld portion in the Z-direction may be estimated based on the positions of multiple peaks, may be estimated based on the positions of the peak and the bottom, or may be estimated based on the positions of multiple bottoms. In other words, the processor 2a uses the reflected wave intensity after the filtering to estimate the range of the weld portion in the Z-direction based on the positions of multiple extrema.

When the intensity distribution of the reflected wave is generated for each of the X-Z cross section and the Y-Z cross section, the range in the Z-direction based on the intensity distribution in the X-Z cross section and the range in the Z-direction based on the intensity distribution in the Y-Z cross section are estimated. For example, the processor 2a calculates the average, the weighted average, the weighted moving average, or the like of the multiple estimation results and uses the calculation results to estimate the range of the entire weld portion in the Z-direction.

Or, the processor 2a may estimate the range of the weld portion in the Z-direction based on the intensity distribution of the reflected wave for one of the X-Z cross section or the Y-Z cross section and use the estimation result as the range of the entire weld portion in the Z-direction. The processor 2a may estimate the range of the weld portion in the Z-direction based on the intensity distribution of the reflected wave for a portion in the X-direction and a portion in the Y-direction and use the estimation result as the range of the entire weld portion in the Z-direction. The calculation amount necessary for the generation of the intensity distribution of the reflected wave can be reduced by such processing.

In the example of FIG. 9, the position in the Z-direction of the lower limit of the range Ra1 is set by subtracting a prescribed value from the position in the Z-direction of the first peak. The position in the Z-direction of the upper limit of the range Ra1 is set by adding a prescribed value to the position in the Z-direction of the second peak. Thereby, the second peak can be suppressed from being outside the range in the Z-direction of the weld portion at some point in the X-Y plane if the upper surface and the lower surface of the weld portion are tilted with respect to the arrangement direction of the ultrasonic sensors 12.

After estimating the range of the weld portion in the Z-direction, the processor 2a estimates the range of the weld portion in the X-direction and the range of the weld portion in the Y-direction.

Figure 10:
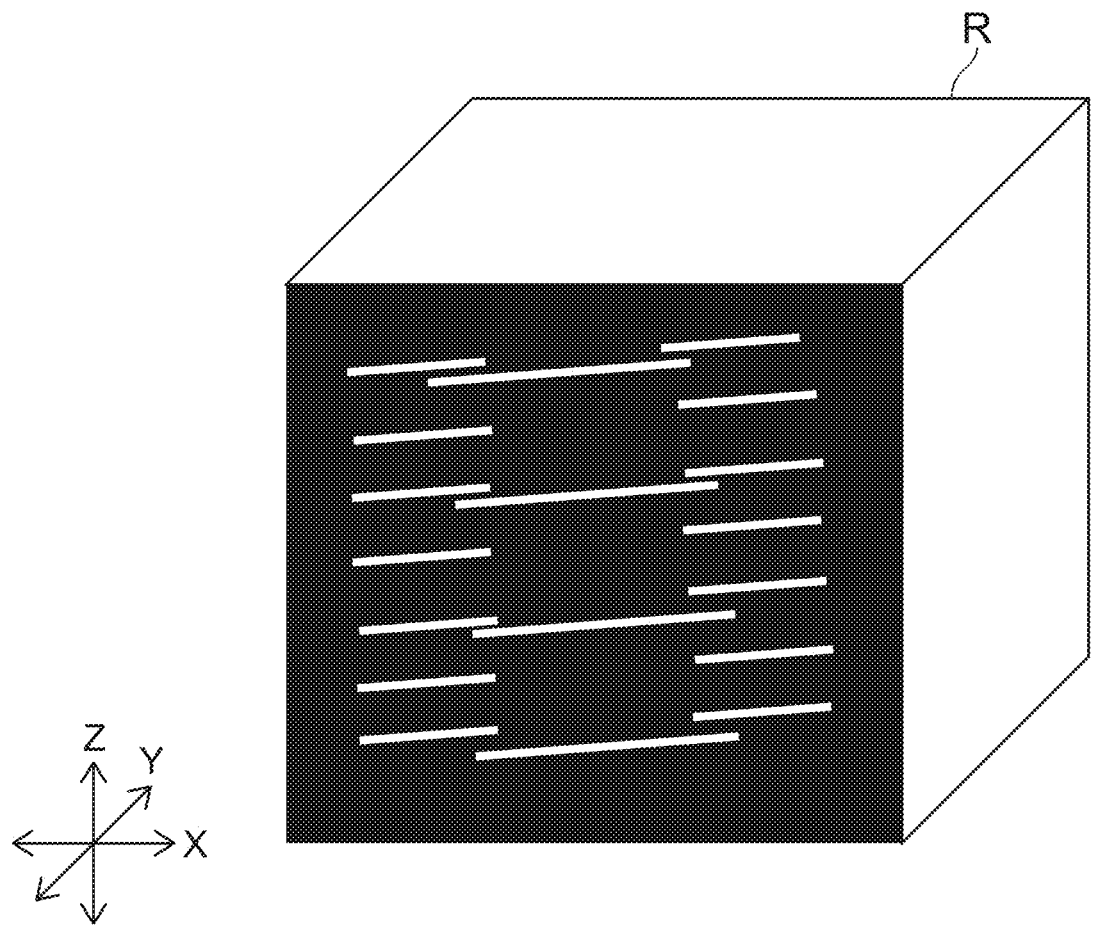
FIG. 10 is a schematic view illustrating the reception result of the reflected waves.
Figure 12:
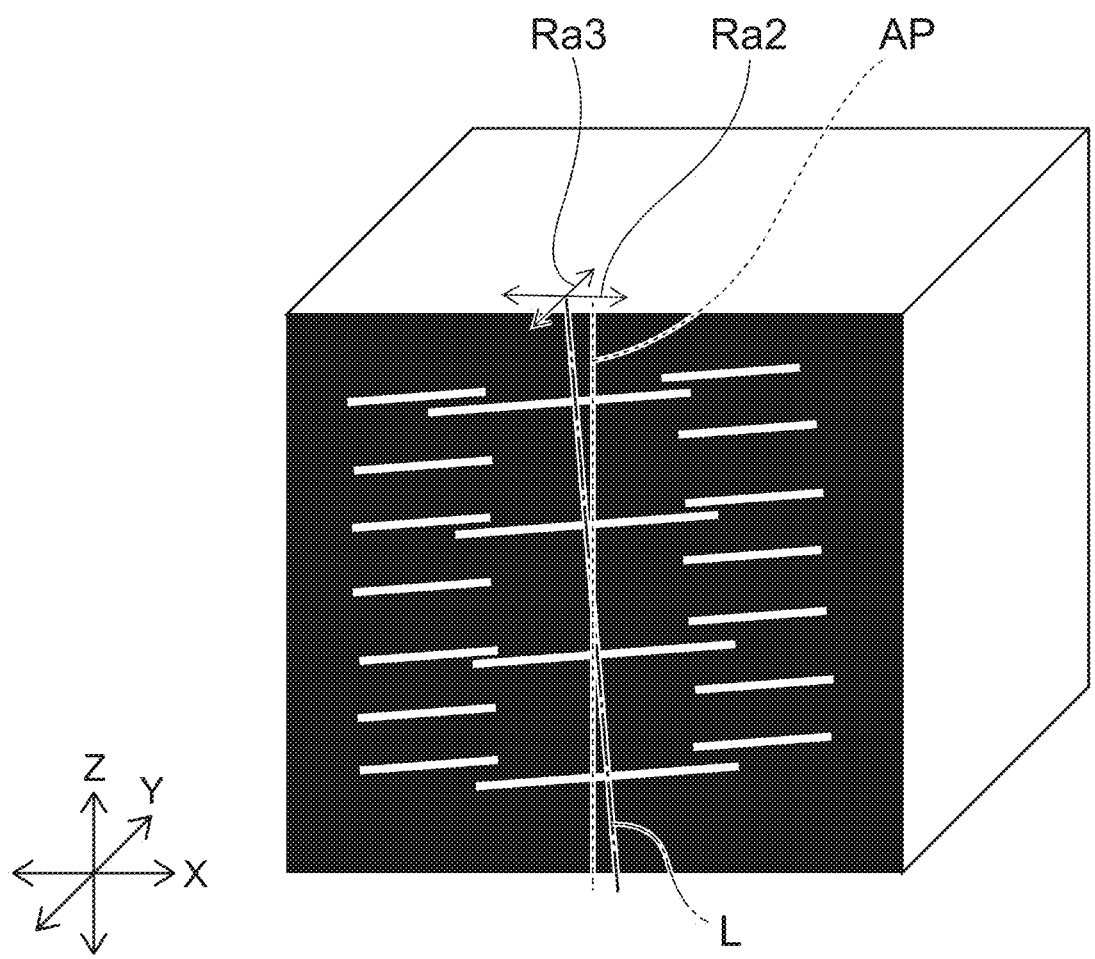
FIG. 12 is a schematic view illustrating the reception result of the reflected waves.

FIG. 10 and FIG. 12 are schematic views illustrating the reception result of the reflected waves.

In FIG. 10 and FIG. 12, a region R is the entire region where the reception result of the reflected waves is obtained by the matrix sensor 11. One cross section of the region R includes the components of the reflected waves of the upper surface and the lower surface of the weld portion and the components of the reflected waves of the upper surfaces and the lower surfaces of the other portions.

The processor 2a generates the intensity distribution of the reflected wave in the X-Y plane for each of multiple points in the Z-direction. The processor 2a may generate the intensity distribution within a preset range in the Z-direction. The calculation amount can be reduced thereby, Or, the processor 2a may generate the intensity distribution within the estimated range in the Z-direction. Thereby, the reflected wave component being outside the lower surface of the weld portion when generating the intensity distribution of the reflected wave in the X-Y plane can be suppressed while reducing the calculation amount.

Figure 11A:
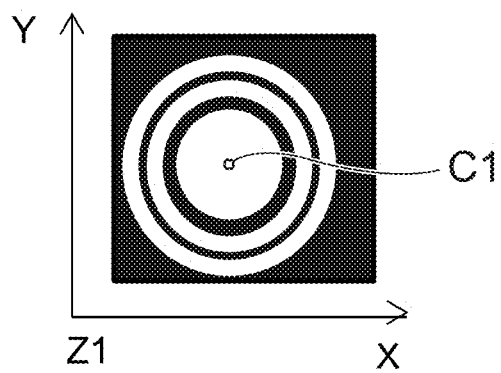
FIGS. 11A to 11C are schematic views illustrating the reception result of the reflected waves.
Figure 11B:
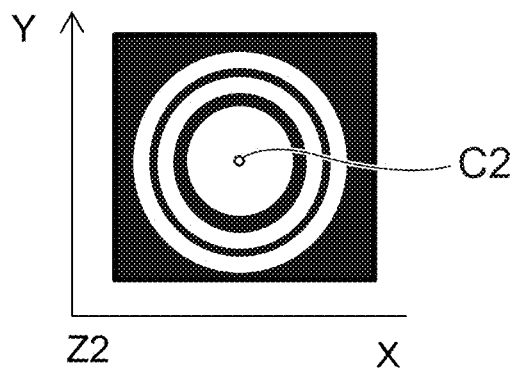
Figure 11C:
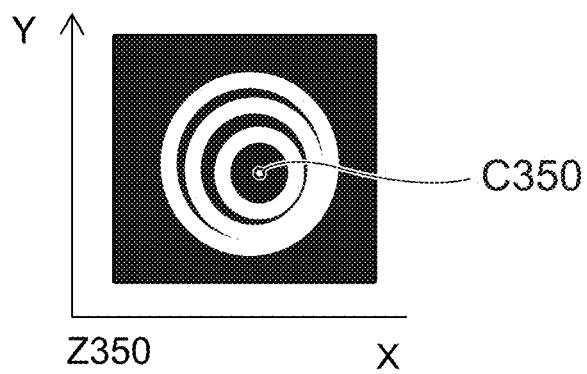

FIG. 11A to FIG. 11C are examples of intensity distributions of the reflected wave in the X-Y plane. FIG. 11A illustrates the intensity distribution of the reflected wave in the X-Y plane at the coordinate of Z=1. FIG. 11B illustrates the intensity distribution of the reflected wave in the X-Y plane at the coordinate of Z=2. FIG. 11C illustrates the intensity distribution of the reflected wave in the X-Y plane at the coordinate of Z=350. The binarized intensity of the reflected wave is illustrated schematically in FIG. 11A to FIG. 11C.

The processor 2a calculates the centroid position of the intensity distribution of the reflected wave in the X-Y plane for each of the multiple points in the Z-direction. Here, the centroid position of the intensity distribution is obtained by calculating the centroid position of an image of the intensity distribution. For example, as illustrated in FIG. 11A to FIG. 11C, the processor 2a calculates centroid positions C1 to C350 of the images. FIG. 12 illustrates the results of a line segment L connecting all of the centroid positions from Z=0 to Z=350.

The processor 2a averages the centroid positions from Z=0 to Z=350. The average position of the centroids in the X-direction and the average position of the centroids in the Y-direction are obtained thereby. In FIG. 12, an average position AP illustrates the average position of the centroids in the X-direction and the average position of the centroids in the Y-direction. The processor 2a uses prescribed ranges in the X-direction and the Y-direction from the average position AP at the center as a range Ra2 of the weld portion in the X-direction and a range Ra3 of the weld portion in the Y-direction.

For example, a value V that indicates the diameter of the probe 10 (the matrix sensor 11) is preset to estimate the range Ra2 and the range Ra3. The processor 2a uses the ranges of AP−V/2 to AP+V/2 as the range Ra2 and the range Ra3 respectively in the X-direction and the Y-direction. In such a case, the estimated range in the X-Y plane is quadrilateral. The estimated range is not limited to the example; the estimated range in the X-Y plane may have a polygonal shape having five or more corners, a circular shape, etc. The shape of the estimated range in the X-Y plane is modifiable as appropriate according to the shape of the weld portion.

The range Ra2 and the range Ra3 may be determined using another value based on the value V. Instead of the value indicating the diameter of the probe 10, a value that indicates the diameter of the weld portion may be preset. This is because the diameter of the weld portion corresponds to the diameter of the probe 10. The value that indicates the diameter of the weld portion can be considered to be a value that substantially indicates the diameter of the probe 10.

The range Ra1 in the Z-direction, the range Ra2 in the X-direction, and the range Ra3 in the Y-direction of the weld portion are estimated by the processing described above. After the ranges are estimated, step S5 illustrated in FIG. 4 is performed based on the reception result of the reflected waves in the estimated ranges.

Figure 13:
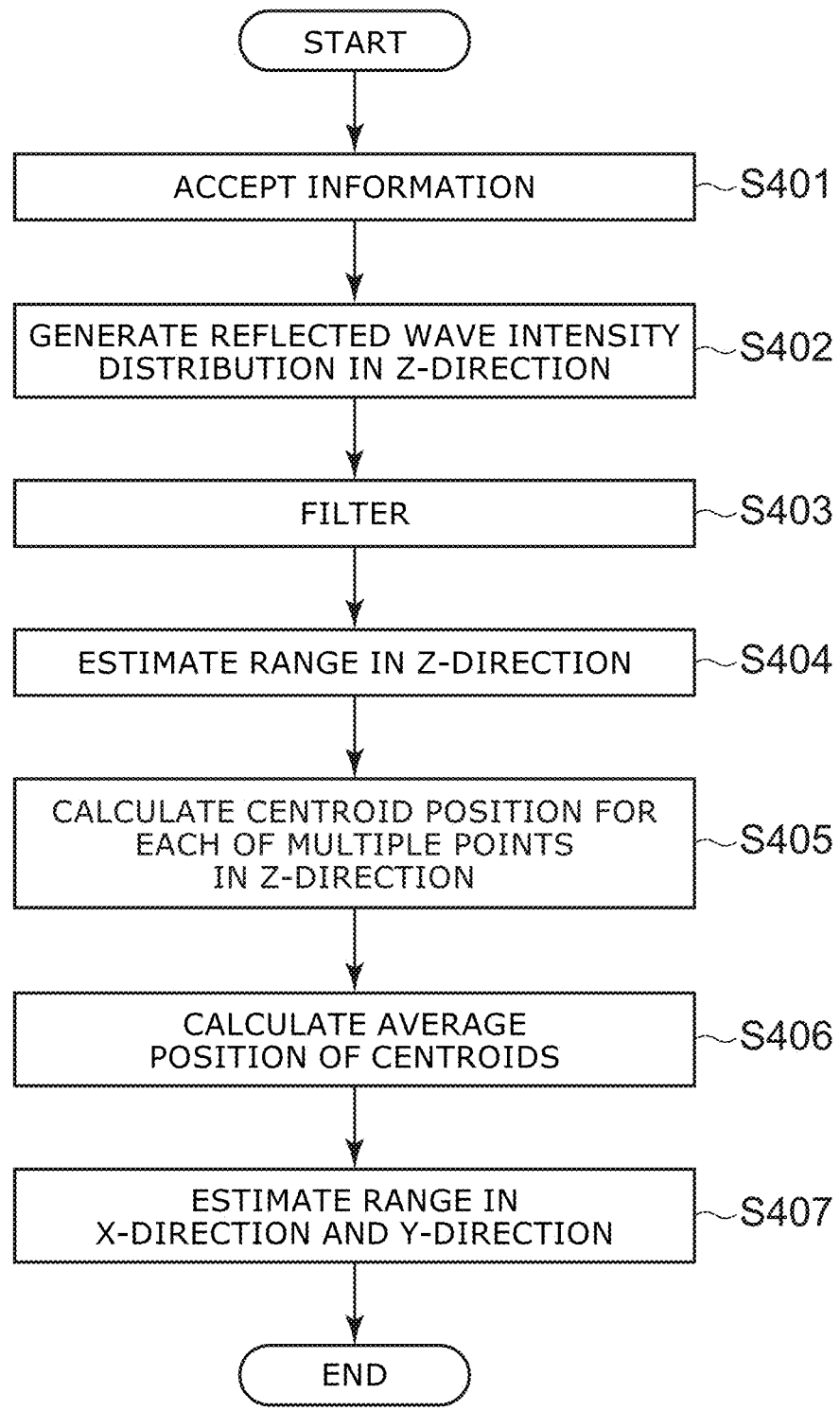
FIG. 13 is a flowchart illustrating an operation of the estimation device according to the embodiment.

FIG. 13 is a flowchart illustrating an operation of the estimation device according to the embodiment.

The processor 2a accepts information transmitted from the inspection apparatus 1 (step S401). The information includes the reception result of the reflected waves of the multiple ultrasonic sensors 12. The processor 2a generates the intensity distribution of the reflected wave in the Z-direction (step S402). The processor 2a filters the intensity distribution based on a value of the thickness of the weld portion (step S403). Thereby, only the reflected wave components of the weld portion are extracted from the intensity distribution. Based on the extraction results, the processor 2a estimates the range of the weld portion in the Z-direction (step S404), The processor 2a calculates the centroid position of the reflected wave intensity in the X-Y plane for each of multiple points in the Z-direction (step S405). The processor 2a calculates the average position by averaging the multiple calculated centroid positions (step S406). Based on the average position and the diameter of the probe 10, the processor 2a estimates the range in each of the X-direction and the Y-direction (step S407).

The estimate of the range in the Z-direction may be performed after estimating the ranges in the X-direction and the Y-direction. For example, steps S402 to S404 may be performed after steps S405 to S407 in the flowchart illustrated in FIG. 13. In such a case, the processor 2a may calculate the intensity distribution of the reflected wave in the Z-direction within the estimated ranges in the X-direction and the Y-direction. The calculation amount can be reduced thereby.

Effects of the embodiment will now be described.

When inspecting the weld portion, it is important to adjust the angle of the probe 10 with respect to the weld portion to be an appropriate value. The angle of the probe 10 can be adjusted based on the reception result of the reflected waves. In such a case, it is desirable to narrow down the range of the reception result utilized in the angle adjustment for each of the X-direction, the Y-direction, and the Z-direction. This is because reflected waves from portions other than the weld portion also are included in the reception results as illustrated in FIG. 6A, FIG. 6B, and FIG. 10. When the reflected waves from the portions other than the weld portion are included in the reception results, it is difficult to appropriately adjust the angle of the probe 10 with respect to the weld portion.

Conventionally, a user designates the range of the weld portion in each of the X-direction, the Y-direction, and the Z-direction to extract the reflected waves from the weld portion from the reception results. According to this method, the angle of the probe 10 can be adjusted more appropriately. However, it is desirable for the user designating the range in each direction to have expert knowledge relating to the inspection, Therefore, the inspection results are dependent on the experience of the user, subjectivity, etc.

Therefore, in the estimation device 2 according to the embodiment, the processor 2a estimates the range of the weld portion in each of the X-direction, the Y-direction, and the Z-direction based on the reception results. Specifically, the processor 2a estimates the range in the Z-direction based on the intensity distribution of the reflected wave in the Z-direction. Also, the processor 2a calculates the centroid position of the intensity distribution of the reflected wave in the X-direction and the Y-direction for each of multiple points in the Z-direction and estimates the range in the X-direction and the range in the Y-direction based on the calculation results. By using the estimation device 2 according to the embodiment, the designation of the range of the weld portion by the user is unnecessary.

For example, based on the estimation result of the processor 2a, the controller 1a adjusts the angle of the probe 10 and inspects the weld portion. The accuracy of the inspection of the weld portion can be increased thereby.

Or, the processor 2a may output the estimation result to the display device 2b, etc. For example, the user can use the estimation result to confirm how much the actual position of the weld portion is shifted from the assumed position.

In the example described above, both the range in the X-direction and the range in the Y-direction are estimated. The range is not limited to the example; the estimation device 2 may estimate only one of the range in the X-direction or the range in the Y-direction. For example, when the multiple ultrasonic sensors 12 are arranged in one direction, the estimation device 2 estimates the range of the weld portion in the Z-direction and the range of the weld portion in the arrangement direction based on the reception results of the ultrasonic sensors 12.

EXAMPLES

Figure 14:
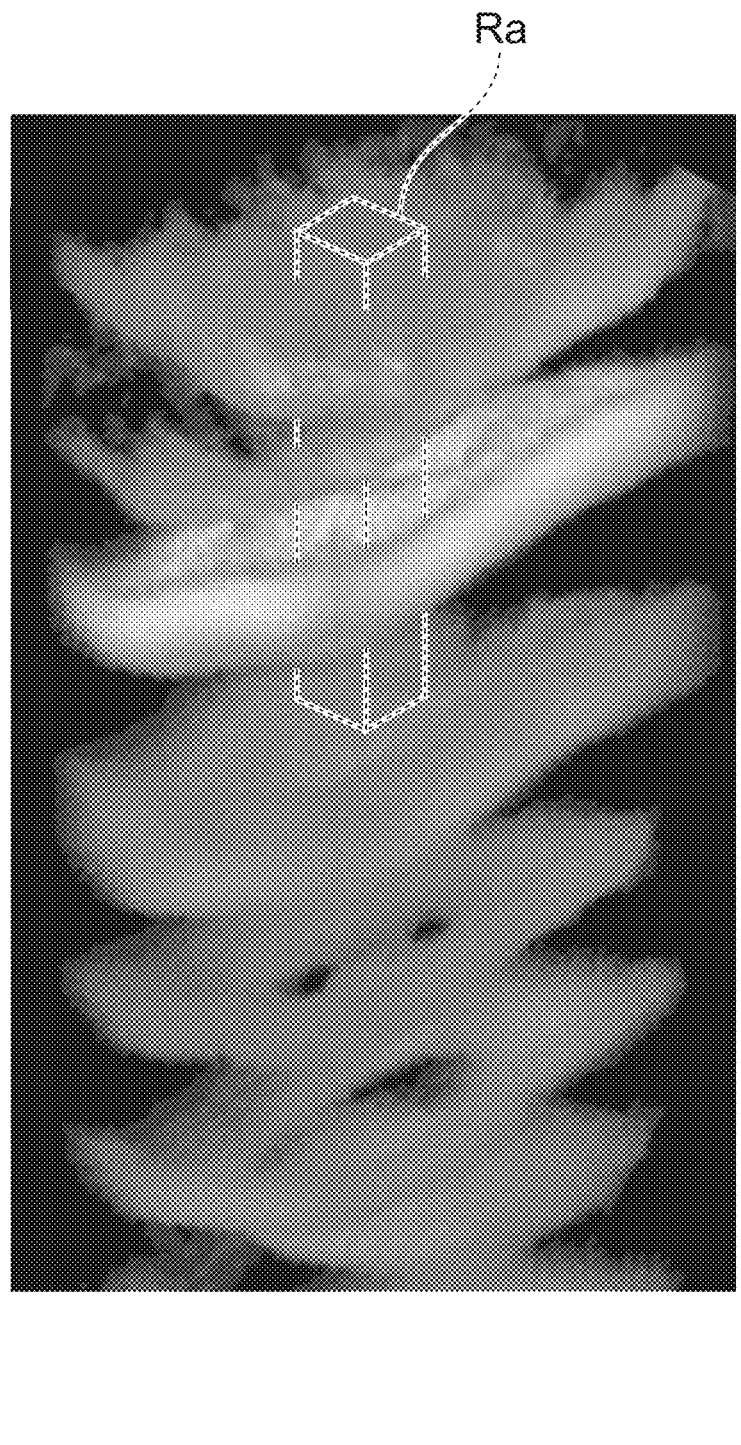
FIG. 14 is an image illustrating a reception result of reflected waves.

FIG. 14 is an image illustrating a reception result of reflected waves.

In FIG. 14, whiter colors mean that the intensity of the reflected wave is greater at that point. The processor 2a performs the operation illustrated in FIG. 13 for the reception result illustrated in FIG. 14. As a result, a range Ra is estimated.

The processor 2a transmits the estimated result to the inspection apparatus 1. The processor 2a may cause the display device 2b to display the image of the reception result of the reflected waves illustrated in FIG. 14 and the estimated range of the weld portion in the image.

For example, as described below, the controller 1a and the processor 2a alternately repeat the estimation of the range Ra described above and the angle adjustment of the probe 10 based on the range Ra.

Figure 15:
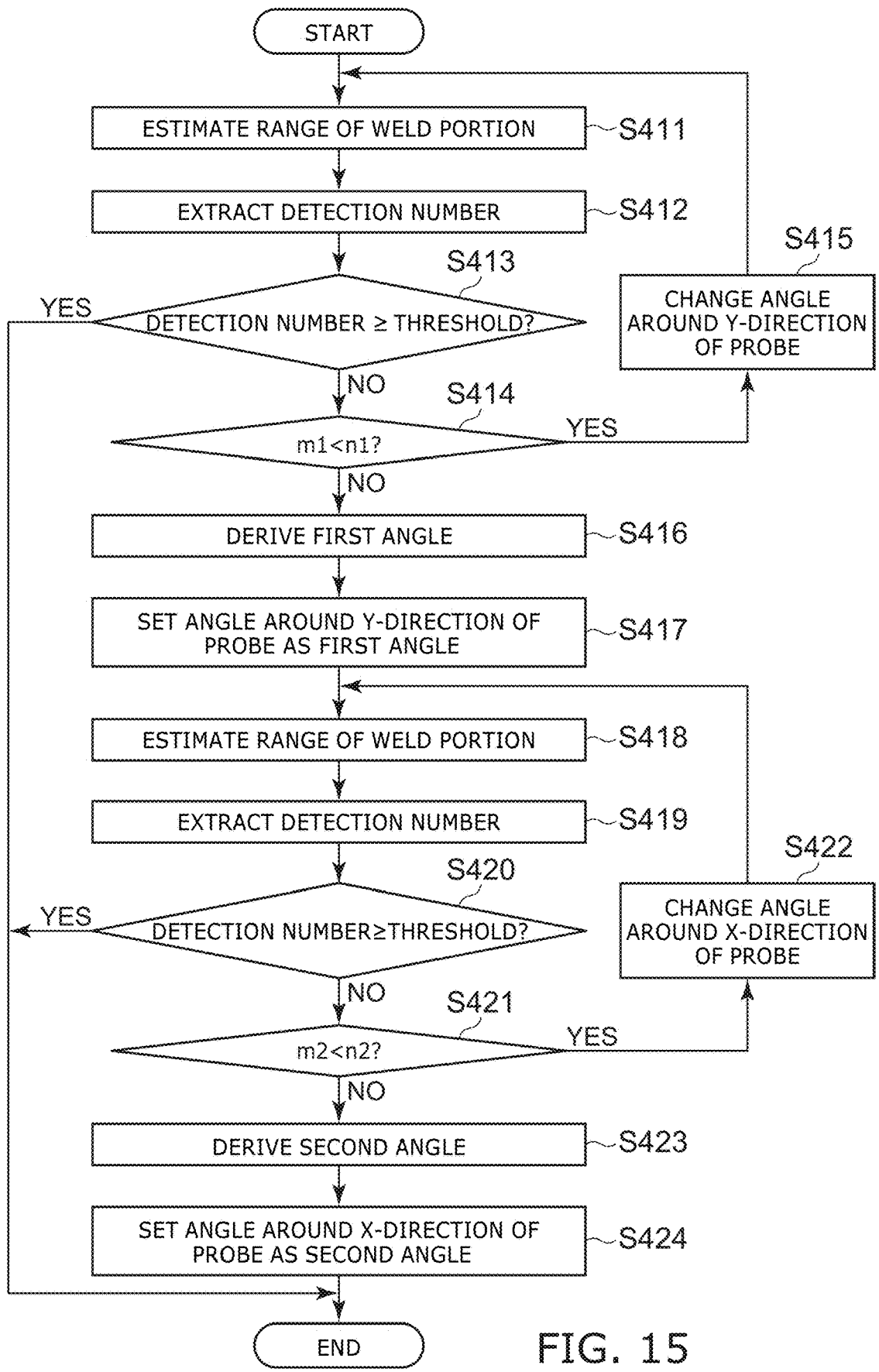
FIG. 15 is a flowchart illustrating an operation of an inspection system according to the embodiment.

FIG. 15 is a flowchart illustrating an operation of an inspection system according to the embodiment.

FIGS. 16A to 16D are figures for describing the inspection system according to the embodiment.

The operation of the flowchart illustrated in FIG. 15 corresponds to steps S4 and S5 of the flowchart illustrated in FIG. 4.

Figure 16A:
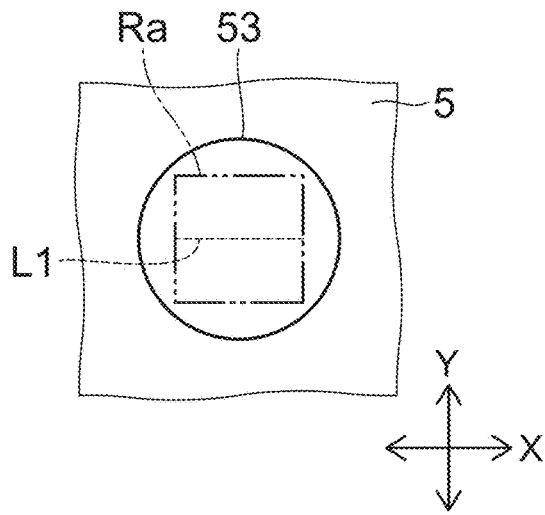
FIGS. 16A to 16D are figures for describing the inspection system according to the embodiment.

First, in the inspection apparatus 1, the multiple ultrasonic sensors 12 transmit ultrasonic waves and receive reflected waves. When accepting information including the reception result of the reflected waves, the estimation device 2 estimates the range of the weld portion based on the information (step S411), The controller 1a extracts the components of the reflected waves in the range estimated from the entire reception result of the reflected waves. FIG. 16A and FIG. 16D are plan views illustrating the weld portion 53 vicinity of the member 5. For example, the components of the reflected waves are extracted from the range Ra illustrated in FIG. 16A.

The controller 1a detects a joint or a non-joint for each of multiple points in the X-Y plane in the range Ra. From the detection results, the controller 1a adjusts the angle around the Y-direction of the probe 10 based on the detection results along a line segment L1 along the X-direction. For example, the line segment L1 is positioned at the center vicinity in the Y-direction of the range Ra.

Figure 16B:
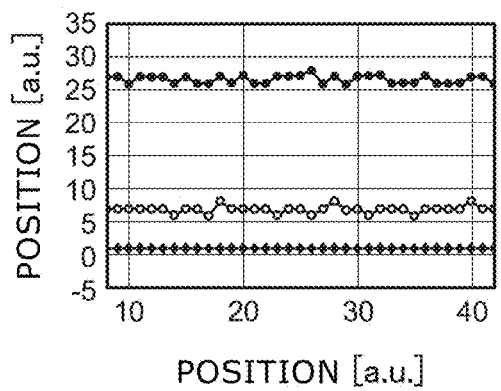

FIG. 16B is an example of the detection result for each of the multiple points on the line segment L1. In FIG. 16B, the vertical axis is the position in the Z-direction. The horizontal axis is the position in the X-direction. In FIG. 16B, ○ (the white circles) illustrate the position in the Z-direction of a reflecting surface occurring first (a first reflecting surface) of the member 5 illustrated in FIG. 5A. In other words, ○ illustrate the position of the upper surface 5b of the weld portion 53. ● (the black circles) illustrate the position in the Z-direction of a reflecting surface occurring second (a second reflecting surface) of the member 5. In other words, ● illustrate the position of the lower surface 5d of the weld portion 53. The positions in the Z-direction of the upper surface and the lower surface are determined based on the peak positions of the reflected wave intensity in the Z-direction for each of the multiple points in the range Ra. ♦ illustrate the detection result of the joint and the non-joint described below.

The controller 1a calculates the distance between the first reflecting surface and the second reflecting surface. For example, when the distance is not less than a preset threshold, the controller 1a determines that the point is joined. When the distance is less than the threshold, the controller 1a determines that the point is not joined. In the graph illustrated in FIG. 16B, the points that are determined to be joined are illustrated by the value of 1, and the points that are determined not to be joined are illustrated by the value of 0.

By the method described above, the controller 1a detects the joint and the non-joint at the multiple points along the X-direction of the member 5. The controller 1a extracts the number of times that the joint is detected (hereinbelow, called the detection number) (step S412). The controller 1a determines whether or not the detection number is not less than a preset threshold (step S413). The threshold is set based on the dimension in the X-direction of the weld portion 53, the density of the ultrasonic sensors 12 in the X-direction, etc.

When the detection number is not less than the threshold, the controller 1a maintains the angle around the Y-direction of the probe 10 and ends the angle adjustment. In such a case, step S7 illustrated in FIG. 4 may be omitted. This is because a sufficient detection number already has been detected, and the weld portion 53 can be considered to be joined appropriately. When the detection number is less than the threshold, the controller 1a compares a number of times m1 that steps S411 and S412 has been performed to a preset value n1 (step S414).

When the number of times m1 is less than the value rat, the controller 1a changes the angle around the Y-direction of the probe 10 (step S415). Then, step S411 is re-performed. Thereby, step S411 and step S412 are performed repeatedly while changing the angle around the Y-direction. When the number of times m1 is not less than the value n1, the controller 1a derives an appropriate first angle around the Y-direction of the probe 10 from the detection result up to that time (step S416).

Figure 16C:
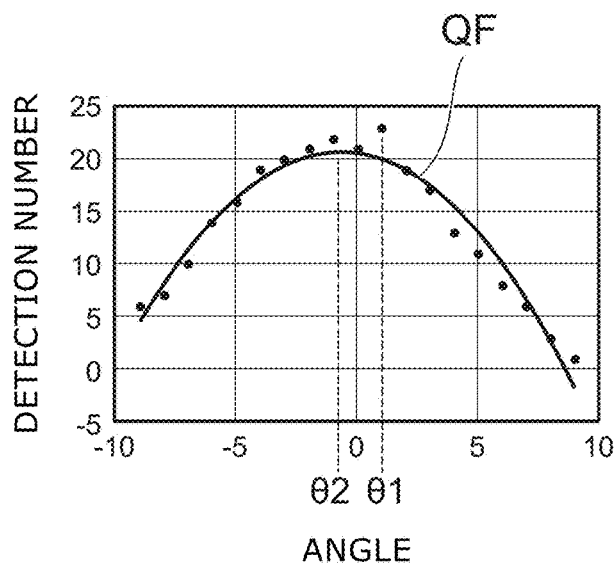
Figure 16D:
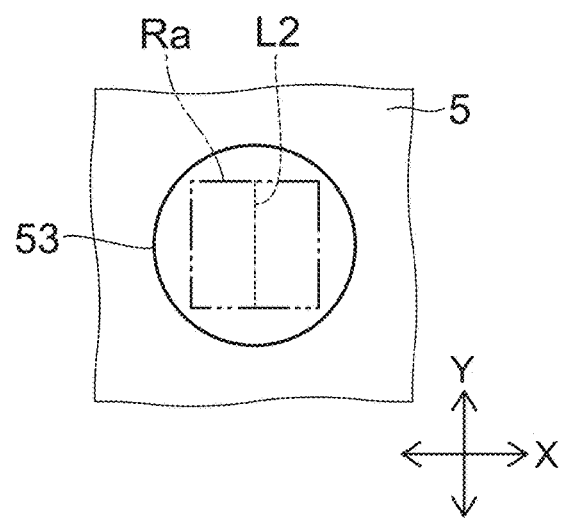

FIG. 16C illustrates an example of the detection results obtained by repeating steps S411 to S415. In FIG. 16C, the horizontal axis is the angle around the Y-direction, and the vertical axis is the detection number at each angle. For example, the controller 1a sets an angle (1 having the highest detection number as the first angle, Or, the controller 1a may generate a quadratic function QF of the relationship between the angle and the detection number and set an angle θ2 where the quadratic function QF has a flexion point as the first angle. The controller 1a sets the angle around the Y-direction of the probe 10 as the first angle (step S417).

Then, in the inspection apparatus 1, the multiple ultrasonic sensors 12 transmit the ultrasonic waves and receive the reflected waves. When accepting the information including the reception result of the reflected waves, the estimation device 2 estimates the range of the weld portion 53 based on the information (step S418). The controller 1a extracts the components of the reflected waves of the estimated range from the entire reception result of the reflected waves.

The controller 1a adjusts the angle around the Y-direction of the probe 10 based on the detection results on a line segment L2 along the Y-direction illustrated in FIG. 16D. For example, the line segment L2 is positioned at the center vicinity in the X-direction of the estimated range Ra.

Similarly to step S412, the controller 1a extracts the detection number for the multiple points along the Y-direction of the member 5 (step S419). The controller 1a determines whether or not the detection number is not less than the preset threshold (step S420). The threshold is set based on the dimension in the Y-direction of the weld portion 53, the density of the ultrasonic sensors 12 in the Y-direction, etc.

When the detection number is not less than the threshold, the controller 1a maintains the angle around the X-direction of the probe 10 and ends the angle adjustment. When the detection number is less than the threshold, the controller 1a compares a number of times m2 that steps S418 and S419 have been performed to a preset value n2 (step S421).

When the number of times m2 is less than the value n2, the controller 1a changes the angle around the X-direction of the probe 10 (step S422). Then, steps S418 to S420 are re-performed.

When the number of times m2 is not less than the value n2, the controller 1a derives an appropriate second angle around the X-direction of the probe 10 from the detection result up to that time (step S423). The derivation of the second angle is performed similarly to the method of step S416. The controller 1a sets the angle around the X-direction of the probe 10 as the second angle (step S424).

By the method described above, the angle of the probe 10 is adjusted appropriately. Subsequently, the inspection of the weld portion 53 is performed by the probe 10.

Figure 17:
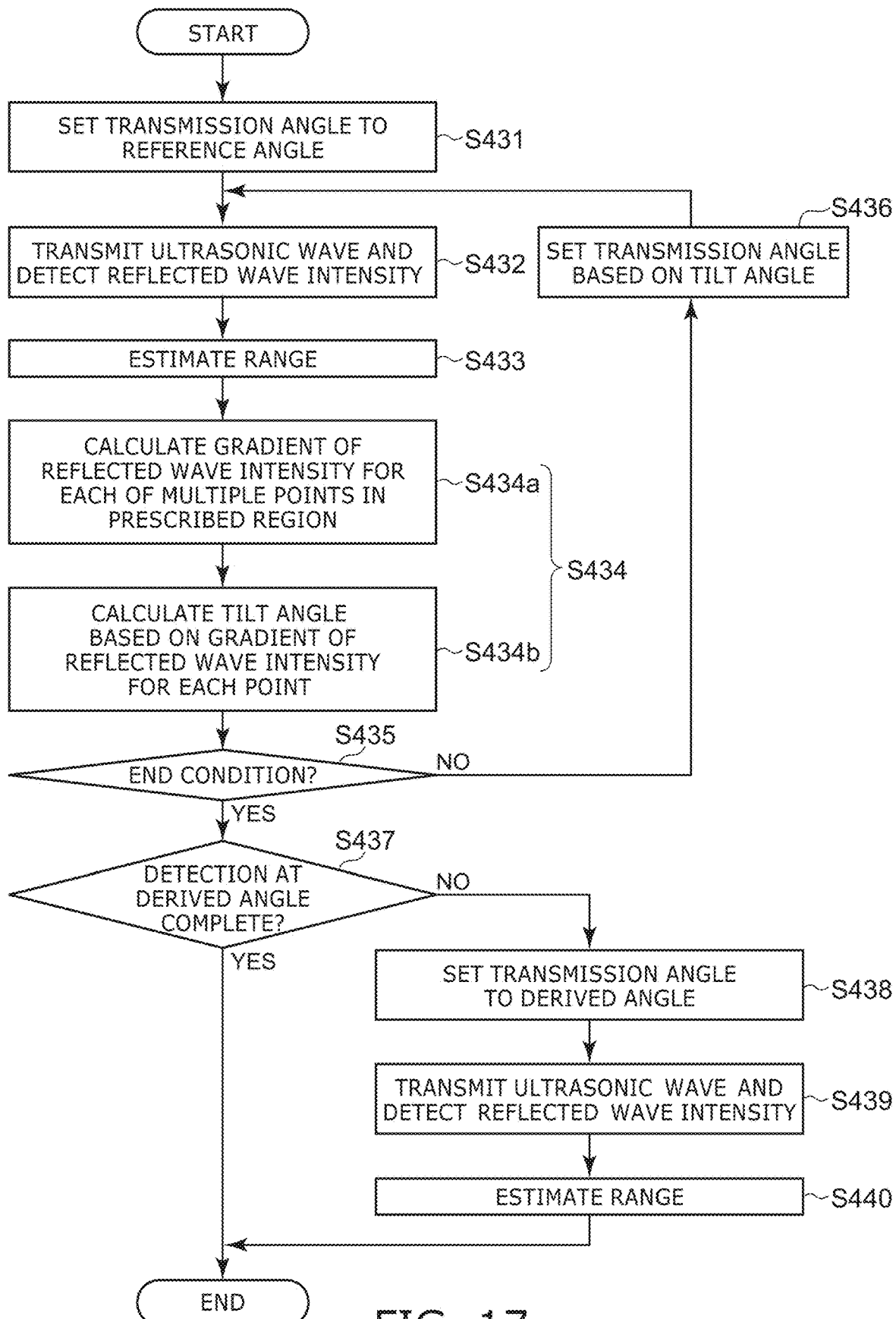
FIG. 17 is a flowchart illustrating another operation of the inspection system according to the embodiment.

FIG. 17 is a flowchart illustrating another operation of the inspection system according to the embodiment.

Figure 18:
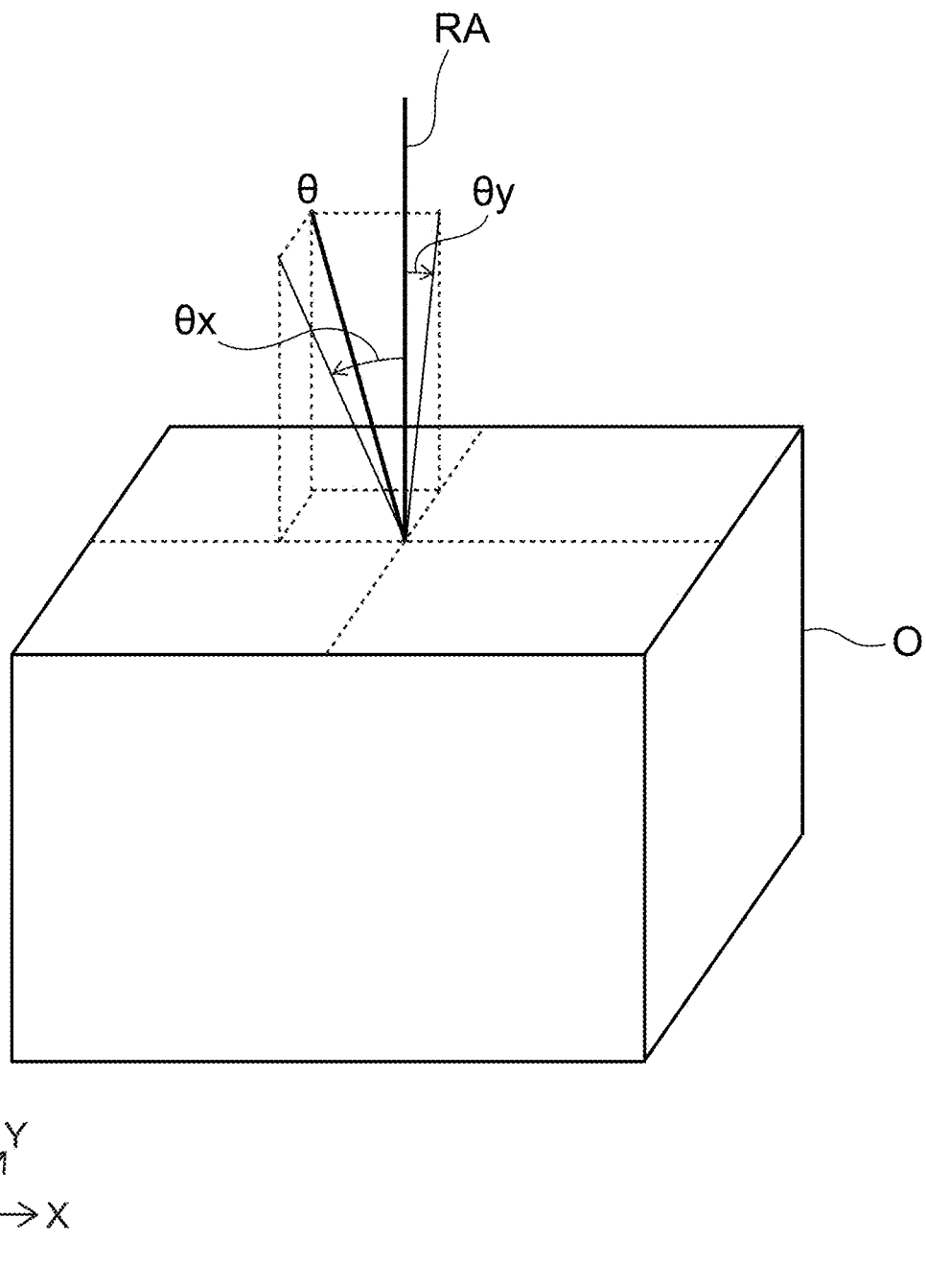
FIG. 18 is a drawing for describing the inspection system according to the embodiment.

FIG. 18 is a drawing for describing the inspection system according to the embodiment.

The operation of the flowchart illustrated in FIG. 17 corresponds to steps S4 and S5 of the flowchart illustrated in FIG. 4.

In step S431 of the flowchart illustrated in FIG. 17, the controller 1a sets a transmission angle for transmitting the ultrasonic wave toward the object. In step S431, the transmission angle is set to a preset reference angle. If the shape and the orientation of an object O are known, the reference angle is set to a value such that the ultrasonic wave is perpendicularly incident on the surface of the object, Or, the reference angle may be set by adding a prescribed value to the value of perpendicular incidence. When the transmission angle is set, the controller 1a causes the ultrasonic waves to be transmitted from the matrix sensor 11.

As illustrated in FIG. 18, the angle information of a transmission angle θ is represented by a tilt $(\theta_x, \theta_y)$ with respect to a reference angle RA, For example, the reference angle RA is equal to the reference angle set as the transmission angle in step S431.

In the inspection apparatus 1, the transmission angle is adjusted by changing the angle of the probe 10. Or, the transmission angle may be adjusted by controlling the transmitting direction of the ultrasonic beam. For example, the transmitting direction of the ultrasonic beam may be adjusted by controlling the driving timing of the ultrasonic sensors 12 arranged in the probe 10 without modifying the angle of the probe 10.

In step S432 (a detecting step), the ultrasonic wave is transmitted from the probe 10 of the inspection apparatus 1 toward the object at the transmission angle set in step S431 in a state in which the probe 10 contacts the weld portion 53. The probe 10 detects the intensity of the reflected wave from the object.

FIG. 19A to FIG. 19C and FIG. 20 are schematic views illustrating images of the weld portion vicinity, FIG. 19A illustrates an image of the weld portion imaged by the imager 20. FIG. 19B illustrates an image corresponding to an A-A' cross section of FIG. 19A. FIG. 19C illustrates an image corresponding to a B-B' cross section of FIG. 19A. FIG. 20 illustrates the entire image. As illustrated in FIG. 20, the image is volume data storing the values at each three-dimensional position.

The image of FIG. 19B illustrates the reflected wave intensity at each point in the X-direction and the Z-direction. The position in the Z-direction corresponds to the time when the reflected wave intensity was detected. In other words, the image of FIG. 19B is based on the results of the reflected wave intensities detected multiple times by the multiple ultrasonic sensors 12 arranged in the X-direction. The image of FIG. 19C illustrates the reflected wave intensity at each point in the Y-direction and the Z-direction. Similarly to FIG. 19B, the position in the Z-direction of the image of FIG. 19C corresponds to the time when the reflected wave intensity was detected. The luminance at each point (pixel) included in the images of FIG. 19B, FIG. 19C, and FIG. 20 corresponds to the intensity of the reflected wave. A higher luminance and a whiter color (a lower dot density) mean that the intensity of the reflected wave is higher.

In the images, portions exist where pixels having relatively high luminances are continuous in directions crossing the Z-direction. In FIG. 19B and FIG. 19C, some of such portions are illustrated as portions p1 to p4. The portions p1 to p4 show surfaces where the ultrasonic wave is reflected strongly.

It can be seen from FIG. 19B and FIG. 19C that the position in the Z-direction where the surface is detected is different between the weld portion 53 and a location other than the weld portion 53. For example, in the image of FIG. 19B, the position in the Z-direction of the portion p1 is different from the position in the Z-direction of the portion p2, In the image of FIG. 19C, the position in the Z-direction of the portion p3 is different from the position in the Z-direction of the portion p4. This is due to the position in the Z-direction of the lower surface of the location other than the weld portion 53 being different from the position in the Z-direction of the lower surface of the weld portion 53.

In step S433 (an estimation step), the processor 2a estimates the range of the weld portion based on the result obtained in step S432.

In step S434 (a calculation step), the controller 1a calculates the gradient of the reflected wave intensity in the range estimated in step S433. The controller 1a calculates the tilt angle indicating the tilt of the object based on the gradient. Specifically, step S434 includes steps S434a and S434b.

Figure 19:
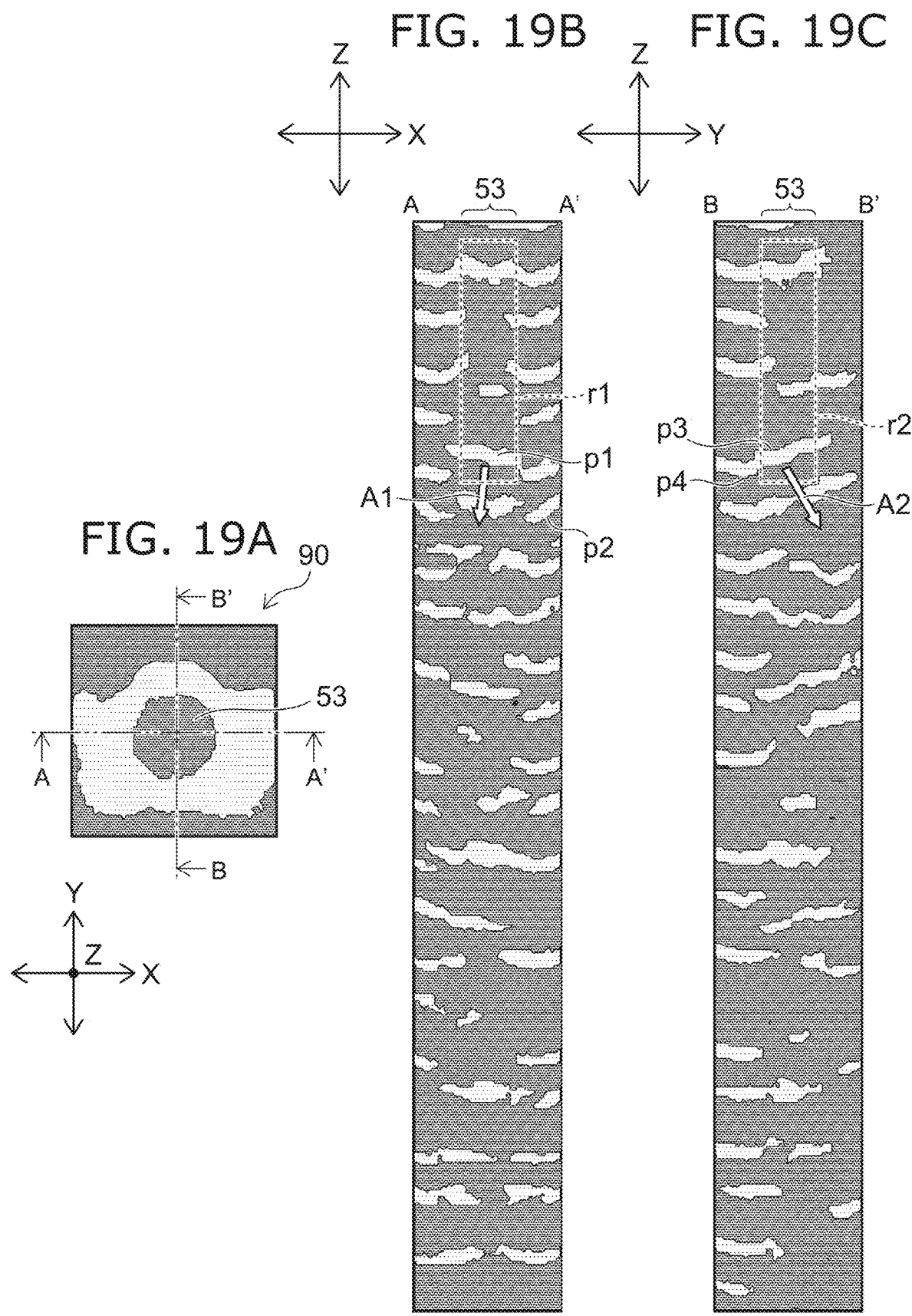
FIG. 19A to FIG. 19C are schematic views illustrating images of the weld portion vicinity.

In step S434a, the gradient of the reflected wave intensity is calculated at each point in the estimated range in three-dimensional space defined by the X-direction, the V-direction, and the Z-direction. When images such as those illustrated in FIG. 19A to FIG. 20 are generated based on the reflected wave intensities, this processing corresponds to calculating the gradient of the pixel value for each pixel in the estimated range.

The intensity of the reflected wave at coordinates (x, y, z) is taken as I(x, y, z). The estimated range is, for example, a region having coordinates satisfying $x1 \le x \le x2$, $y1 \le y \le y2$, and $z1 \le z \le z2$. Regions r1 and r2 of FIG. 19B and FIG. 19C are examples of the estimated range.

The gradient of the intensity of the reflected wave is calculated by the following Formula 1.

$$G(x,y,z)=(I(x+1,y,z)-I(x,y,z),I(x,y+1,z)-I(x,y,z),I(x,y,z+1)-I(x,y,z)) \quad \text{(Formula 1)}$$

G(x, y, z) is a three-dimensional vector representing the gradient of the reflected wave intensity in the X-direction, the Y-direction, and the Z-direction for the coordinates (x, y, z). Formula 1 calculates the gradient using forward difference. General gradient calculation methods such as backward difference, central difference, etc., also may be used.

In step S434b, the tilt angle that indicates the tilt of the weld portion 53 is calculated based on the gradient of the reflected wave intensity, First, the average of the gradient calculated in the prescribed region described above is calculated. This is called the average gradient. The method for calculating the average gradient is not limited to a simple average and may be a weighted average.

For example, the weight that is assigned is set to increase as the X coordinate and the Y coordinate approach the center of the estimated range. The X coordinate and the Y coordinate of the center of the estimated range are respectively ((x1+x2)/2, (y1+y2)/2). The effects of the region other than the weld portion 53 on the average processing can be reduced thereby. Or, the weight that is assigned may be larger as the value of G(x, y, z) increases. Or, the weight may be assigned based on information relating to the object of the inspection. For example, the weight that is assigned may be larger as the Z-direction coordinate where the upper surface or the lower surface of the weld portion 53 is predicted to appear is approached. Thereby, the average processing can be based more on the reflected waves from the upper surface or the lower surface of the weld portion 53. Or, the average processing described above may be replaced with processing that calculates the median.

The difference angle that indicates the tilt of the weld portion 53 with respect to the transmission angle is calculated using the average gradient described above. The average gradient is written as GM, First, the scale information is excluded from the average gradient, and the two-dimensional vector of the following formula showing the direction information is calculated.

$$(GM(x)/GM(z), GM(y)/GM(z)) \quad \text{(Formula 2)}$$

GM(x), GM(y), and GM(z) are respectively the X-, Y-, and Z-direction components of the average gradient. The $\theta_x$ component of the difference angle is calculated from the first component of Formula 2, and the $\theta_y$ component of the difference angle is calculated from the second component of Formula 2. The calculation can be performed by employing a method of solving backward from the detection pitch of the reflected wave intensity in the X-direction, the Y-direction, and the Z-direction.

Or, beforehand, the weld portion 53 may be tilted at various angles, and the probe 10 may detect the reflected waves at the angles. A table of the relationship between the difference angle and the first component and the second component of Formula 2 is made based on the detection results. The angles are calculated using the table. Or, the calculation relationship may be stored as a regression equation. Then, the tilt angle that corresponds to the tilt of the object is calculated by reversing the sign of the difference angle and adding the result to the current transmission angle.

Arrow A1 shown in the image of FIG. 19B illustrates the gradient of the reflected wave intensity in the X-Z plane. Similarly, arrow A2 shown in the image of FIG. 19C illustrates the gradient of the reflected wave intensity in the Y-Z plane.

The tilt angle may be referenced to the reference angle RA as described above, or may be an angle made by reversing the sign of the difference angle with respect to the transmission angle at that point in time. For example, the difference between the transmission angle and the calculated tilt of the surface of the object may be calculated as the tilt angle. Such a difference also substantially indicates the tilt of the object.

In step S435 (a determining step), the controller 1a determines whether or not to end the acquisition of the image. Step S436 (a setting step) is performed when the end has not been determined. In step S436, the controller 1a resets the transmission angle based on the tilt angle calculated in step S434. The controller 1a again performs step S432 at the reset transmission angle. In other words, a first loop that includes steps S432 to S435 is repeated until the end is determined in step S435.

For example, the end is determined in step S435 when steps S432 to S434 have been repeated a prescribed number of times.

In another example, the tilt angle that is calculated in step S434 is prestored for each repetition. The end is determined when the calculation result of the tilt angle is determined to have converged. For example, the first loop is performed multiple times, and a first tilt angle is calculated by the nth step S434. A second tilt angle is calculated by the (n+1)th step S434. The difference between the second tilt angle and the first tilt angle is calculated, and the end is determined when the difference becomes less than a prescribed value. The difference between the second tilt angle and the first tilt angle is, for example, the sum of the absolute value of the difference of the $\theta_x$ components and the absolute value of the difference of the $\theta_y$ components.

For example, in step S436, the tilt angle is used as-is as a transmission angle $\theta_{NEXT}$ that is newly set.

Or, the transmission angle $\theta_{NEXT}$ may be set using the current transmission angle $\theta$ and the tilt angle. For example, the difference between the transmission angle $\theta_{NEXT}$ and the transmission angle $\theta$ may be determined to be greater than the difference between the tilt angle and the transmission angle $\theta$. At this time, the difference for at least one of the $\theta_x$ component or the $\theta_y$ component is set to be greater. Thereby, the tilt angle is recalculated to be an angle that is different from the transmission angle $\theta$ and near the tilt angle predicted as the tilt of the weld portion 53. The accuracy of the tilt angle calculated next can be increased thereby. The change amount of the angle can be increased if the calculated tilt angle is less than the actual tilt of the weld portion 53 due to the detection accuracy of the intensity of the reflected wave, etc. Thereby, the convergence of the repeatedly-calculated tilt angle can be faster.

In particular, there are many cases where the transmission angle $\theta$ does not converge while the number of times of updates of the transmission angle $\theta_{NEXT}$ is low. Accordingly, until step S436 is performed a prescribed number of times, it is desirable to set the transmission angle $\theta_{NEXT}$ so that the difference between the transmission angle $\theta_{NEXT}$ and the transmission angle $\theta$ is greater than the difference between the tilt angle and the transmission angle $\theta$. After the prescribed number of times, for example, it is desirable to set the transmission angle $\theta_{NEXT}$ so that the difference between the transmission angle $\theta_{NEXT}$ and the transmission angle $\theta$ is equal to the difference between the tilt angle and the transmission angle $\theta$.

Figure 21A:
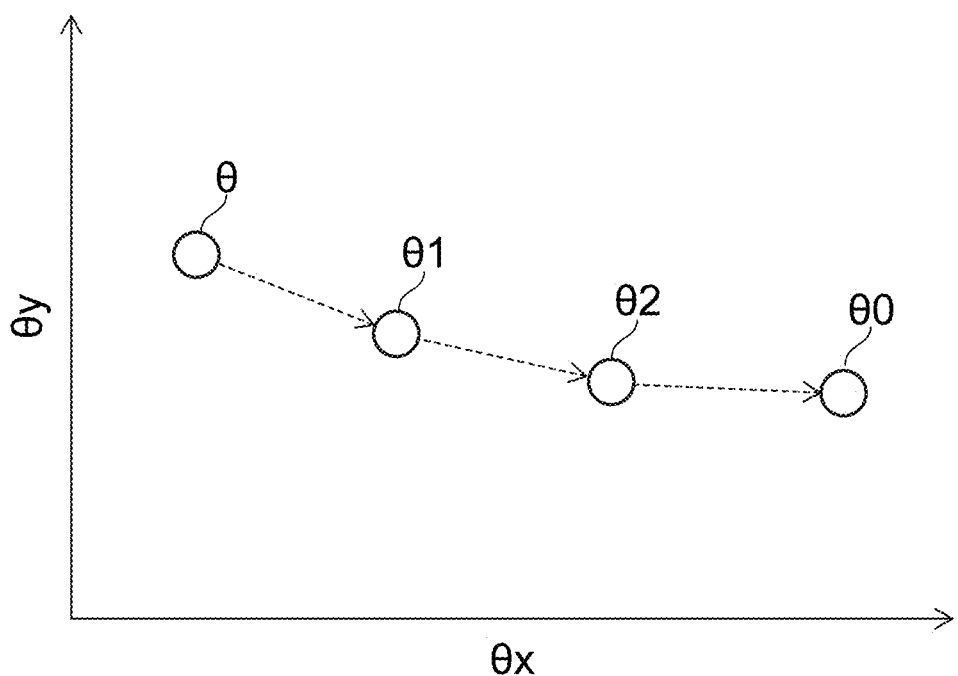
FIGS. 21A and 21B are schematic views for describing other operations of the inspection system according to the embodiment.
Figure 21B:
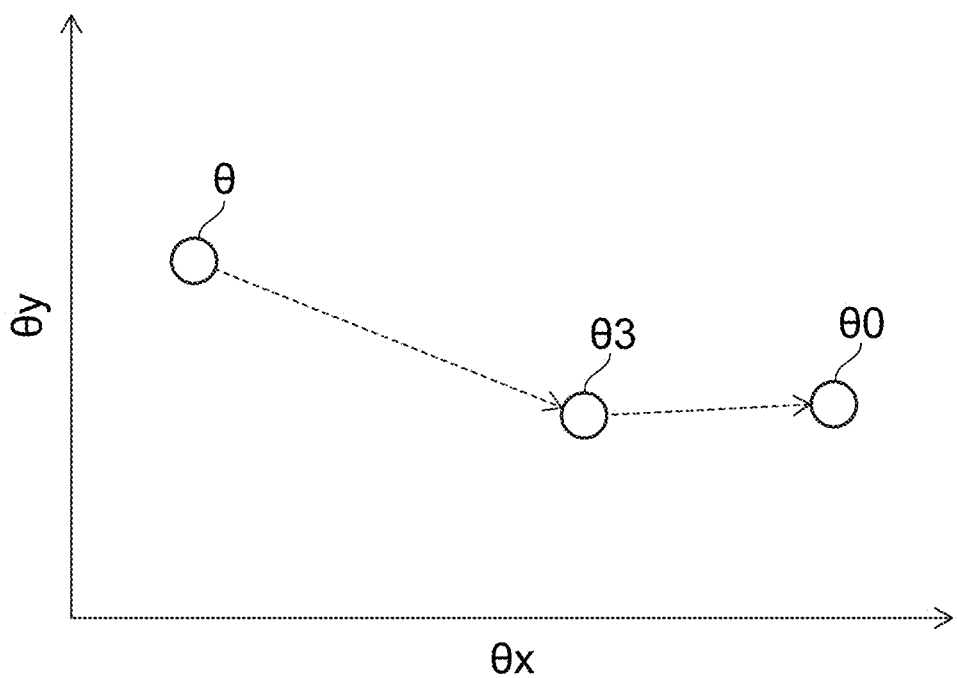

FIGS. 21A and 21B are schematic views for describing other operations of the inspection system according to the embodiment.

In FIGS. 21A and 21B, the horizontal axis is the $\theta_x$ component, and the vertical axis is the $\theta_y$ component. FIG. 21A illustrates the transition of the transmission angle when the tilt angle that is calculated as the transmission angle $\theta_{NEXT}$ is used as-is. FIG. 21B illustrates the transition of the transmission angle when the transmission angle $\theta_{NEXT}$ is set so that the difference between the transmission angle $\theta_{NEXT}$ and the transmission angle $\theta$ is 2 times the difference between the tilt angle and the transmission angle $\theta$ in the initial setting of the transmission angle $\theta_{NEXT}$.

As in the transmission angles $\theta$, 01, and 02 illustrated in FIG. 21A, there are cases where the transmission angle gradually converges toward an actual tilt angle $\theta 0$ of the weld portion 53 if the detection accuracy of the intensity of the reflected wave is low. For such a case, the method described above can cause the transmission angle to converge rapidly toward the tilt angle $\theta 0$ as in the transmission angles θ and θ3 illustrated in FIG. 21B. Thereby, the number of times that the first loop is performed can be low, and the time necessary for the inspection can be reduced.

As another example, the tilt angle is stored for each repetition, and the transmission angle $\theta_{NEXT}$ is calculated based on the tilt angles calculated within a prescribed number of times of repetitions. For example, $\theta_{NEXT}$ is calculated using the average of the tilt angles calculated within the prescribed number of times of repetitions.

Step S437 is performed when the end is determined in step S435. In step S437, it is determined whether or not step S432 was performed in the state in which the transmission angle is set to a derived angle. The derived angle is derived based on the tilt angles calculated up to this point, and is the angle estimated to correspond to the tilt of the object. For example, the tilt angle that is calculated directly before is set as the derived angle. This is because the tilt angle that is calculated directly before is considered to be most proximal to the actual tilt of the object, Or, the average of the multiple tilt angles calculated directly before may be set as the derived angle. Steps S438 to S440 are performed if step S432 has not been performed in the state in which the transmission angle is set to the derived angle. In step S438, the transmission angle is set to the derived angle. In step S439, similarly to step S432, the ultrasonic wave is transmitted toward the object at the set transmission angle, and the intensity of the reflected wave is detected. An image may be generated based on the detection result of step S439. In step S440, similarly to step S433, the range of the weld portion 53 is estimated based on the reflected wave intensity.

The operation ends after step S440 or when step S432 already has been performed in the state in which the transmission angle is set to the derived angle, Subsequently, the weld portion 53 is inspected at the adjusted angle.

Modifications

The processor 2a may estimate the range in the Z-direction for each of multiple portions in the X-Y plane. For example, the processor 2a calculates the intensity distribution of the reflected wave for each of multiple points in the X-direction and each of multiple points in the Y-direction. Or, the processor 2a may calculate the intensity distribution of the reflected wave for prescribed ranges in the X-direction and prescribed ranges in the Y-direction.

In such a case, peaks are not obtained in the intensity distribution of the portions outside the weld portion if filtering is performed. For example, the processor 2a does not estimate the range in the Z-direction in portions where peaks are not obtained. Or, the processor 2a may exclude the portions where peaks are not obtained from the estimated range in the X-direction and the estimated range in the Y-direction of the weld portion.

Figure 22A:
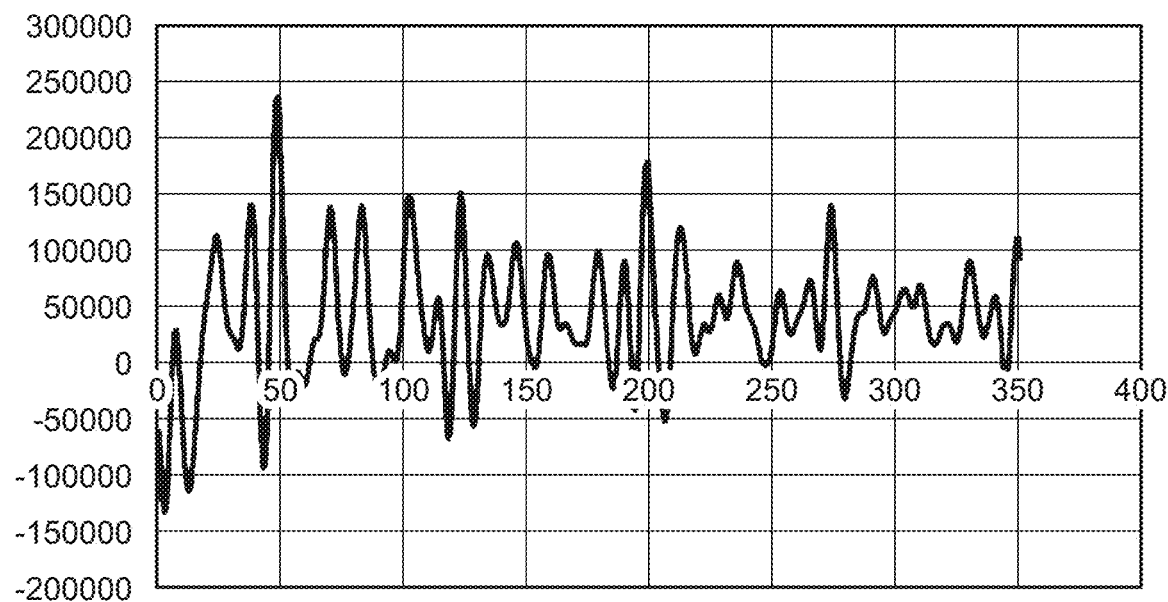
FIG. 22A and FIG. 22B are graphs illustrating the intensity distributions of the reflected waves in the Z-direction.
Figure 22B:
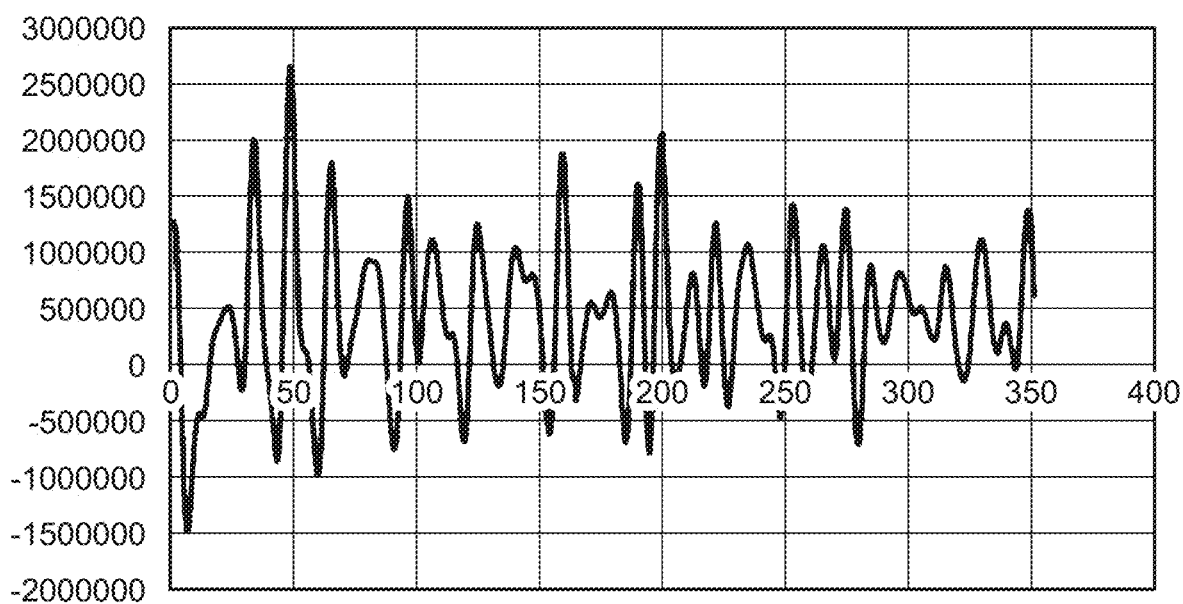

FIG. 22A and FIG. 22B are graphs illustrating the intensity distributions of the reflected waves in the Z-direction.

FIG. 22A and FIG. 22B illustrate the intensity distribution of the reflected wave in the Z-direction for designated portions in the X-Y plane.

After the intensity distribution is generated, the range in the Z-direction is estimated for each of multiple portions in the X-Y plane by the method illustrated in FIG. 13. After estimating the range in the Z-direction, the centroid position is calculated for each of multiple points in the Z-direction, and the range in the X-direction and the range in the Y-direction are estimated based on the multiple centroid positions.

Figure 23:
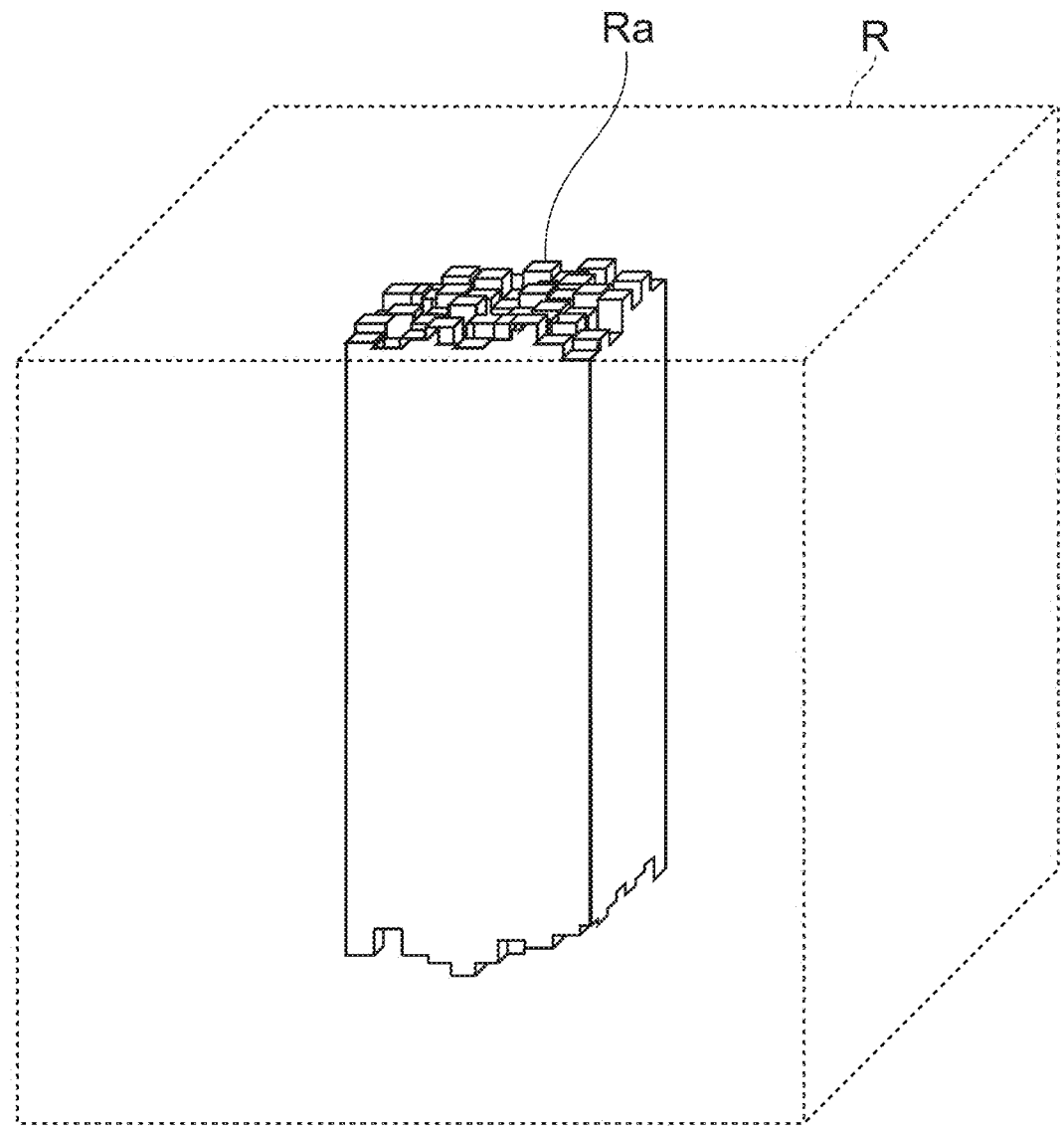
FIG. 23 is a schematic view illustrating the range of the weld portion estimated by the estimation device according to the modification.

FIG. 23 is a schematic view illustrating the range of the weld portion estimated by the estimation device according to the modification.

In FIG. 23, the region R is the entire region where the reception result of the reflected waves is obtained by the matrix sensor 11. The range Ra illustrates the estimation result of the estimation device. In the modification, the range in the Z-direction is estimated for each of multiple portions in the X-Y plane. Therefore, as illustrated in FIG. 23, the range in the Z-direction may be different between the portions in the X-Y plane.

The processor 2a performs the angle adjustment of the probe 10 and the inspection of the weld portion based on the reception result of the reflected waves in the range Ra illustrated in FIG. 23.

Figure 24:
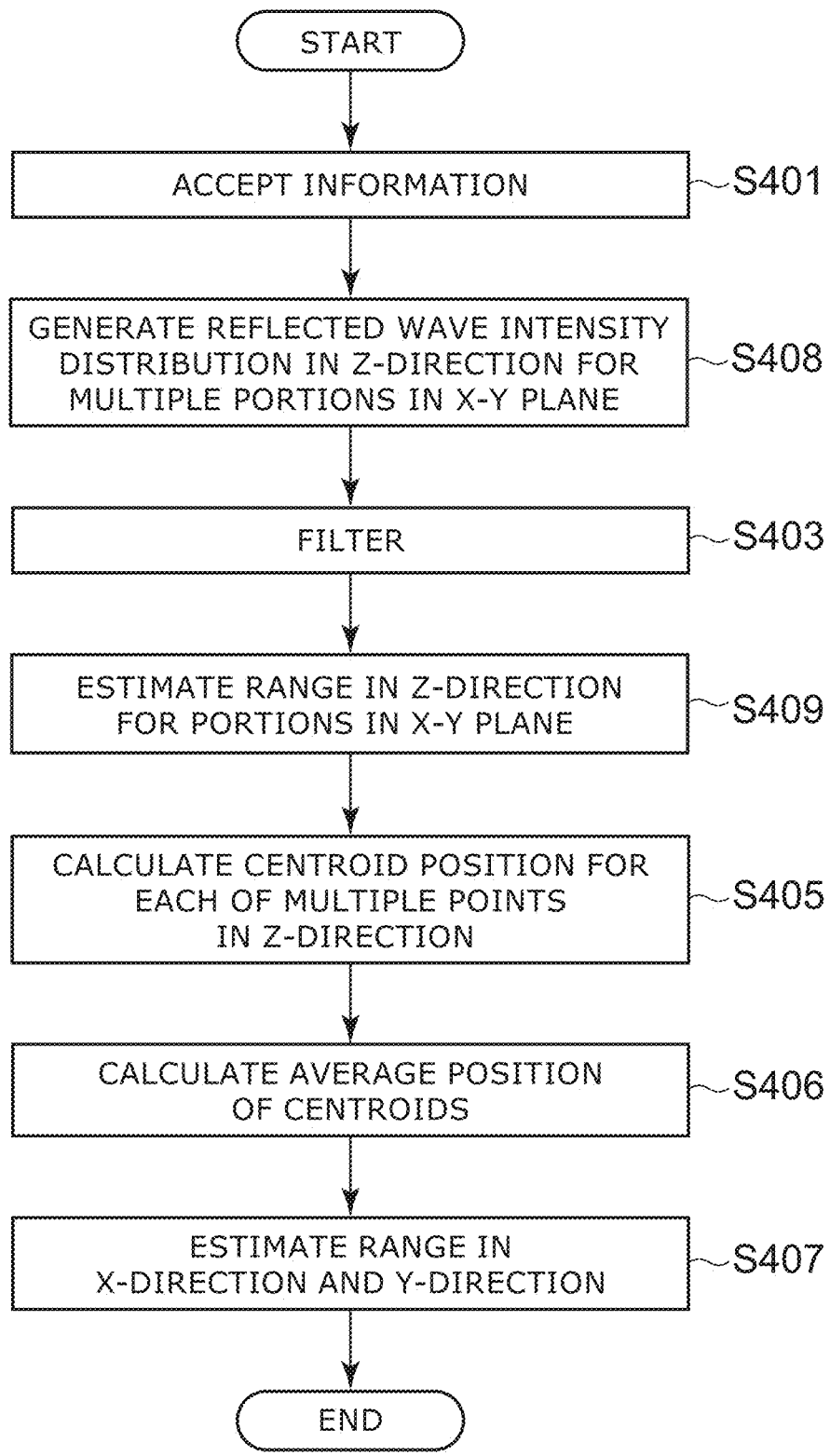
FIG. 24 is a flowchart illustrating an operation of the estimation device according to the modification of the embodiment.

FIG. 24 is a flowchart illustrating an operation of the estimation device according to the modification of the embodiment.

The processor 2a accepts information transmitted from the inspection apparatus 1 (step S401). The processor 2a generates the intensity distribution of the reflected wave in the Z-direction for each of the multiple portions in the X-Y plane (step S408). The processor 2a extracts the reflected wave components of the weld portion by filtering each intensity distribution (step S403). Based on each of the extraction results, the processor 2a estimates the range of the weld portion in the Z-direction for each of the portions (step S409). Thereafter, processing similar to steps S405 to S407 of the flowchart illustrated in FIG. 13 is performed.

According to the operation illustrated in FIG. 24, a more detailed range of the weld portion can be estimated. The accuracy of the inspection can be improved further by performing the angle adjustment of the probe 10, the inspection of the weld portion, etc., based on the detailed range. On the other hand, as illustrated in FIG. 7A, FIG. 7B, and FIG. 8, the calculation amount of the estimation device 2 can be reduced by estimating the range of the weld portion based on the intensity distribution of each cross section or the intensity distribution in which the intensities are summed in the X-Y plane.

According to the estimation device 2, the inspection system 100, or the estimation method described above, the range of the weld portion can be estimated with high accuracy. Similarly, the range of the weld portion can be estimated with high accuracy by using a program causing the processor 2a to perform the estimation method described above or a storage medium storing the program.

For example, the processing of the various data recited above is executed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

The estimation device 2 according to the embodiments includes one or multiple devices (e.g., personal computers, etc.). The estimation device 2 according to the embodiments may include multiple devices connected by a network.

In an example described above, the probe 10 is provided at the tip of the arm 40, and the angle of the probe 10 is adjusted automatically by the controller 1a. The probe 10 is not limited to the example; the probe 10 may be configured to be held by a human. The estimation device 2 estimates the range of the weld portion based on the reception result of the reflected waves obtained by such a probe 10. For example, the controller 1a displays to the user how much the angle of the probe 10 should be moved and in which direction. For example, the tilt angle that is calculated by the controller 1a is displayed by the display device 2b. The estimation device 2 may display the image shown in FIG. 19A to FIG. 19C in the display device 2b and may display information to the user to show the tilt angle such as arrows A1 and A2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. An estimation device, comprising:
   a processor estimating a range of a weld portion in a second direction based on an intensity distribution of a reflected wave in the second direction, a plurality of ultrasonic sensors transmitting an ultrasonic wave in the second direction toward the weld portion and receiving the reflected wave, the plurality of ultrasonic sensors being arranged in a first direction crossing the second direction, and
   the processor calculating a centroid position of an intensity distribution of the reflected wave in the first direction for each of a plurality of points in the second direction, and estimating a range of the weld portion in the first direction based on a plurality of the centroid positions.

2. The estimation device according to claim 1, wherein
   the processor estimates the range of the weld portion based on the plurality of centroid positions and a first preset dimension, and
   the first preset dimension is a dimension of the plurality of ultrasonic sensors in the first direction or is a dimension of the weld portion in the first direction.

3. The estimation device according to claim 2, wherein
   the processor refers to a first position of a first peak and a second position of a second peak in the intensity distribution of the reflected wave in the second direction,
   the first peak is part of the reflected wave from a first surface of the weld portion,
   the second peak is another part of the reflected wave from a second surface of the weld portion, and
   the processor further estimates a range of the weld portion in the second direction based on the first position and the second position.

4. The estimation device according to claim 1, wherein
   the plurality of ultrasonic sensors is arranged in the first direction and a third direction, the third direction being perpendicular to the first direction and crossing the second direction,
   the processor calculates the centroid position of the intensity distribution of the reflected wave in the first direction and the third direction for each of the plurality of points in the second direction, and
   the processor further estimates a range of the weld portion in the third direction based on the plurality of centroid positions.

5. The estimation device according to claim 4, wherein
   the processor estimates the range of the weld portion in the third direction based on the plurality of centroid positions and a second preset dimension, and
   the second preset dimension is a dimension of the plurality of ultrasonic sensors in the third direction or is a dimension of the weld portion in the third direction.

6. The estimation device according to claim 1, wherein
   the processor displays an image indicating the intensity distribution of the reflected wave on a display device, and
   the display device displays the estimated range on the image.

7. An estimation device according to claim 1, wherein each the plurality of ultrasonic sensors sequentially transmits the ultrasonic wave and the plurality of ultrasonic sensors receives the reflected wave.

8. An inspection system, comprising:
   the estimation device according to claim 1; and
   an inspection apparatus including a probe, the probe including the plurality of ultrasonic sensors,
   the inspection apparatus inspecting the weld portion based on an intensity of the reflected wave within the estimated range of the weld portion in the first direction.

9. An inspection system, comprising:
   the estimation device according to claim 1; and
   an inspection apparatus including a probe, the probe including the plurality of ultrasonic sensors,
   the inspection apparatus calculating an angle of the probe with respect to the weld portion, the angle being calculated based on an intensity of the reflected wave within the estimated range of the weld portion in the first direction.

10. The inspection system according to claim 9, wherein
    the inspection apparatus further includes
    an arm, the probe provided at a tip of the arm; and
    a controller driving the arm, and
    the controller displaces the probe by driving the arm according to the estimated range of the weld portion in the first direction and the estimated range of the weld portion in the second direction.

11. The inspection system according to claim 10, wherein
    the plurality of ultrasonic sensors transmits an other ultrasonic wave and receives an other reflected wave after displacing the prove,
    the inspection apparatus inspecting the weld portion based on an intensity of the other reflected wave within the estimated range of the weld portion in the first direction.

12. An estimation method, comprising:
    estimating a range of a weld portion in a second direction based on an intensity distribution of a reflected wave in the second direction, a plurality of ultrasonic sensors transmitting an ultrasonic wave in the second direction toward the weld portion and receiving the reflected wave, the plurality of ultrasonic sensors being arranged in a first direction crossing the second direction; and calculating a centroid position of an intensity distribution of the reflected wave in the first direction for each of a plurality of points in the second direction, and estimating a range of the weld portion in the first direction based on a plurality of the centroid positions.

13. An inspection method, comprising:

the estimation method according to claim 12; and inspecting, using a probe, the weld portion based on an intensity of the reflected wave within the estimated range of the weld portion in the first direction, the probe including the plurality of ultrasonic sensors.

14. A non transitory computer-readable storage medium storing a program, the program causing a computer to execute the estimation method according to claim 12.

\* \* \* \* \*